United States Patent
Slaight et al.

(10) Patent No.: US 11,604,746 B2
(45) Date of Patent: Mar. 14, 2023

(54) PRESENTATION OF DIRECT ACCESSED STORAGE UNDER A LOGICAL DRIVE MODEL

(71) Applicant: SK hynix NAND Product Solutions Corp., San Jose, CA (US)

(72) Inventors: Thomas M. Slaight, Beaverton, OR (US); Sivakumar Radhakrishnan, Portland, OR (US); Mark Schmisseur, Phoenix, AZ (US); Pankaj Kumar, Chandler, AZ (US); Saptarshi Mondal, Chandler, AZ (US); Sin S. Tan, Portland, OR (US); David C. Lee, Beaverton, OR (US); Marc T. Jones, Longmont, CO (US); Geetani R. Edirisooriya, Tempe, AZ (US); Bradley A. Burres, Waltham, MA (US); Brian M. Leitner, Hillsboro, OR (US); Kenneth C. Haren, Portland, OR (US); Michael T. Klinglesmith, Portland, OR (US); Matthew R. Wilcox, Ottawa (CA); Eric J. Dahlen, Sherwood, OR (US)

(73) Assignee: SK hynix NAND Product Solutions Corp., Santa Clara, CA (US)

( * ) Notice: Subject to any disclaimer, the term of this patent is extended or adjusted under 35 U.S.C. 154(b) by 0 days.

(21) Appl. No.: 16/936,078

(22) Filed: Jul. 22, 2020

(65) Prior Publication Data
US 2020/0349100 A1    Nov. 5, 2020

Related U.S. Application Data

(60) Continuation of application No. 15/224,006, filed on Jul. 29, 2016, now abandoned, which is a division of
(Continued)

(51) Int. Cl.
*G06F 13/40* (2006.01)
*G06F 13/28* (2006.01)
(Continued)

(52) U.S. Cl.
CPC .............. *G06F 13/28* (2013.01); *G06F 3/061* (2013.01); *G06F 3/064* (2013.01); *G06F 3/065* (2013.01);
(Continued)

(58) Field of Classification Search
CPC ...... G06F 13/28; G06F 3/0661; G06F 3/0607; G06F 3/0673; G06F 3/061; G06F 3/0626;
(Continued)

(56) References Cited

U.S. PATENT DOCUMENTS 5,617,425 A    4/1997    Anderson
5,742,752 A    4/1998    Dekoning
(Continued)

FOREIGN PATENT DOCUMENTS

CN    1223444 A    7/1999
CN    1447242 A    10/2003
(Continued)

OTHER PUBLICATIONS

"PCI Express and Non-Transparent Bridging Support High Availability," by Akber Kazmim, dated Jan.-Feb. 2004, 4 pages.
(Continued)

*Primary Examiner* — Idriss N Alrobaye
*Assistant Examiner* — Ronald T Modo
(74) *Attorney, Agent, or Firm* — Byrne Poh LLP

(57) ABSTRACT

In accordance with embodiments disclosed herein, there are provided methods, systems, mechanisms, techniques, and apparatuses for presentation of direct accessed storage under a logical drive model; for implementing a distributed architecture for cooperative NVM Data protection; data mirroring
(Continued)

for consistent SSD latency; for boosting a controller's performance and RAS with DIF support via concurrent RAID processing; for implementing arbitration and resource schemes of a doorbell mechanism, including doorbell arbitration for fairness and prevention of attack congestion; and for implementing multiple interrupt generation using a messaging unit and NTB in a controller through use of an interrupt coalescing scheme.

17 Claims, 25 Drawing Sheets

Related U.S. Application Data application No. 13/976,262, filed as application No. PCT/US2011/054313 on Sep. 30, 2011, now Pat. No. 9,417,821.

(51) Int. Cl.
| | |
|---|---|
| *G06F 3/06* | (2006.01) |
| *G06F 11/10* | (2006.01) |
| *G06F 13/16* | (2006.01) |
| *G06F 13/42* | (2006.01) |
| *G06F 12/0866* | (2016.01) |
| *G06F 13/10* | (2006.01) |
| *G06F 12/0886* | (2016.01) |

(52) U.S. Cl.
CPC .......... *G06F 3/0607* (2013.01); *G06F 3/0613* (2013.01); *G06F 3/0619* (2013.01); *G06F 3/0626* (2013.01); *G06F 3/0646* (2013.01); *G06F 3/0659* (2013.01); *G06F 3/0661* (2013.01); *G06F 3/0673* (2013.01); *G06F 3/0688* (2013.01); *G06F 3/0689* (2013.01); *G06F 11/1068* (2013.01); *G06F 12/0866* (2013.01); *G06F 13/102* (2013.01); *G06F 13/1668* (2013.01); *G06F 13/4068* (2013.01); *G06F 13/4282* (2013.01); *G06F 2212/262* (2013.01); *G06F 2213/0026* (2013.01); *G06F 2213/0032* (2013.01)

(58) Field of Classification Search
CPC ...... G06F 3/065; G06F 3/0659; G06F 13/102; G06F 13/1668; G06F 13/4068; G06F 13/4282; G06F 3/0619; G06F 3/0646; G06F 3/0688; G06F 11/1068; G06F 3/0613; G06F 3/064; G06F 3/0689; G06F 12/0866; G06F 2213/0026; G06F 2213/0032; G06F 2212/262

See application file for complete search history.

(56) References Cited

U.S. PATENT DOCUMENTS

| | | | |
|---|---|---|---|
| 6,606,651 | B1 | 8/2003 | Linde |
| 7,761,658 | B2 | 7/2010 | Cravens et al. |
| 7,836,379 | B1 | 11/2010 | Ricci et al. |
| 7,945,752 | B1 | 5/2011 | Miller et al. |
| 2004/0177181 | A1 | 9/2004 | Yamamoto |
| 2005/0108472 | A1 | 5/2005 | Kanai et al. |
| 2005/0138312 | A1 | 6/2005 | Kubo et al. |
| 2006/0294416 | A1 | 12/2006 | Tsai et al. |
| 2007/0266037 | A1* | 11/2007 | Terry ................... G06F 3/0607 |
| 2008/0109616 | A1 | 5/2008 | Taylor |
| 2008/0147893 | A1 | 6/2008 | Marripudi et al. |
| 2008/0162797 | A1 | 7/2008 | Teicher et al. |
| 2008/0270645 | A1 | 10/2008 | Ellis et al. |
| 2009/0083485 | A1 | 3/2009 | Cheng |
| 2010/0073860 | A1 | 3/2010 | Moriai et al. |
| 2010/0125695 | A1 | 5/2010 | Wu et al. |
| 2010/0199041 | A1 | 8/2010 | Schnapp et al. |
| 2010/0287433 | A1 | 11/2010 | Mu |
| 2010/0293349 | A1* | 11/2010 | Lionetti ............... G06F 9/45558 711/162 |
| 2010/0293351 | A1 | 11/2010 | Kotsch et al. |
| 2011/0004728 | A1* | 1/2011 | Schuette ............... G06F 12/0868 711/113 |
| 2011/0258362 | A1 | 10/2011 | McLaren et al. |
| 2011/0289280 | A1 | 11/2011 | Koseki et al. |
| 2011/0314354 | A1 | 12/2011 | Fillingim |
| 2012/0072680 | A1 | 3/2012 | Kimura et al. |
| 2012/0079189 | A1 | 3/2012 | Colgrove et al. |
| 2012/0284446 | A1* | 11/2012 | Biran ................... G06F 13/4022 710/306 |
| 2013/0007544 | A1* | 1/2013 | Nemazie ............... G11C 29/4401 714/723 |

FOREIGN PATENT DOCUMENTS

| | | |
|---|---|---|
| CN | 1458764 A | 11/2003 |
| CN | 101829234 A | 9/2010 |
| CN | 101859234 A | 10/2010 |
| CN | 101866307 A | 10/2010 |
| CN | 101997646 A | 3/2011 |
| CN | 102063348 A | 5/2011 |
| CN | 102169419 A | 8/2011 |
| WO | 2010071655 A1 | 6/2010 |
| WO | 2011044515 A2 | 4/2011 |

OTHER PUBLICATIONS

Advisory Action for U.S. Appl. No. 13/976,262, dated Feb. 22, 2016, 3 pages.
Chinese Office Action dated Sep. 11, 2017 for Chinese Patent Application No. 201180075095.8, 6 pages, (best available copy attached).
Chinese Office Action for Chinese Patent Application No. 201610305654.4 dated Aug. 29, 2019 (Best Available Copy).
European Search Report and Written Opinion received for EP Patent Application No. 18196396.8, dated Nov. 19, 2018, 9 pages.
European Search Report for EP18196396 dated Nov. 8, 2018.
Examination Report for European Patent Application No. 11873475.5 dated Sep. 4, 2017, 4 pages.
Extended European Search Report for European Patent Application No. 11873475.5 dated May 15, 2015, 7 pages.
Final Office Action for U.S. Appl. No. 13/976,262, dated Nov. 30, 2015, 15 pages.
Final Office Action for U.S. Appl. No. 15/224,006, dated Nov. 27, 2018, 17 pages.
Final Office Action for U.S. Appl. No. 15/224,006, dated Oct. 10, 2019, 23 pages.
First Office Action for Chinese Patent Application No. 201180075095.8, dated Feb. 15, 2016, 11 pages.
Fourth Office Action dated Jun. 8, 2017, for Chinese Patent Application No. 201180075095.8, 11 pages.
Office Action dated Jun. 11, 2018, for Chinese Patent Application No. 201610305654.4, 9 pages. (Best available copy attached).
Office Action for U.S. Appl. No. 13/976,262, dated Jun. 17, 2015, 12 pages.
Office Action for U.S. Appl. No. 15/224,006, dated Apr. 19, 2019, 23 pages.
Office Action for U.S. Appl. No. 15/224,006, dated Apr. 22, 2020, 13 pages.
Office Action for U.S. Appl. No. 15/224,006, dated May 1, 2018, 19 pages.
Office Action received for Chinese Patent Application No. 201610305654.4, dated Mar. 14, 2019, 20 pages (12 pages of English Translation and 8 pages of Office Action).
Office Action received for EP Patent Application No. 11873475.5, dated Jun. 6, 2018, 9 pages.
PCT International Preliminary Report on Patentability for PCT/US2011/054313 dated Apr. 10, 2014, 6 pages.

(56) References Cited

OTHER PUBLICATIONS

PCT International Search Report for PCT/US2011/054313, dated May 14, 2012, dated May 14, 2012, 3 pages.
PCT Written Opinion of the International Searching Authority for PCT/US2011/054313, dated May 14, 2012, 4 pages.
Restriction Requirement for U.S. Appl. No. 13/976,262, dated Mar. 11, 2015, 7 pages.
Second Office Action for Chinese Patent Application No. 201180075095.8 dated Oct. 17, 2016, 11 pages.
Third Office Action dated Mar. 9, 2017, for Chinese Patent Application No. 201180075095.8, 11 pages.
European Examination Report for Patent Application No. 18196396.8, dated Feb. 4, 2021, 5 pages.

* cited by examiner

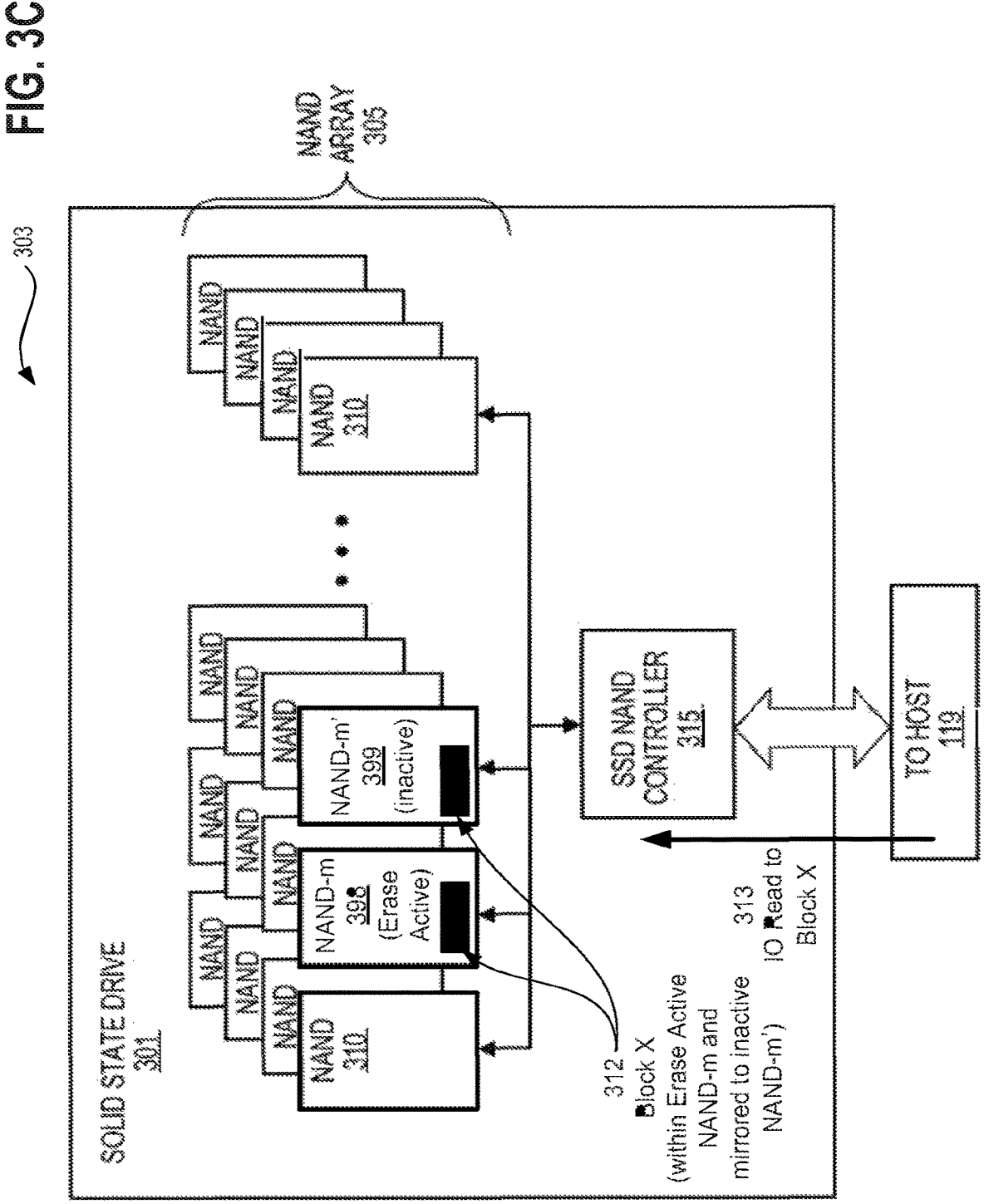

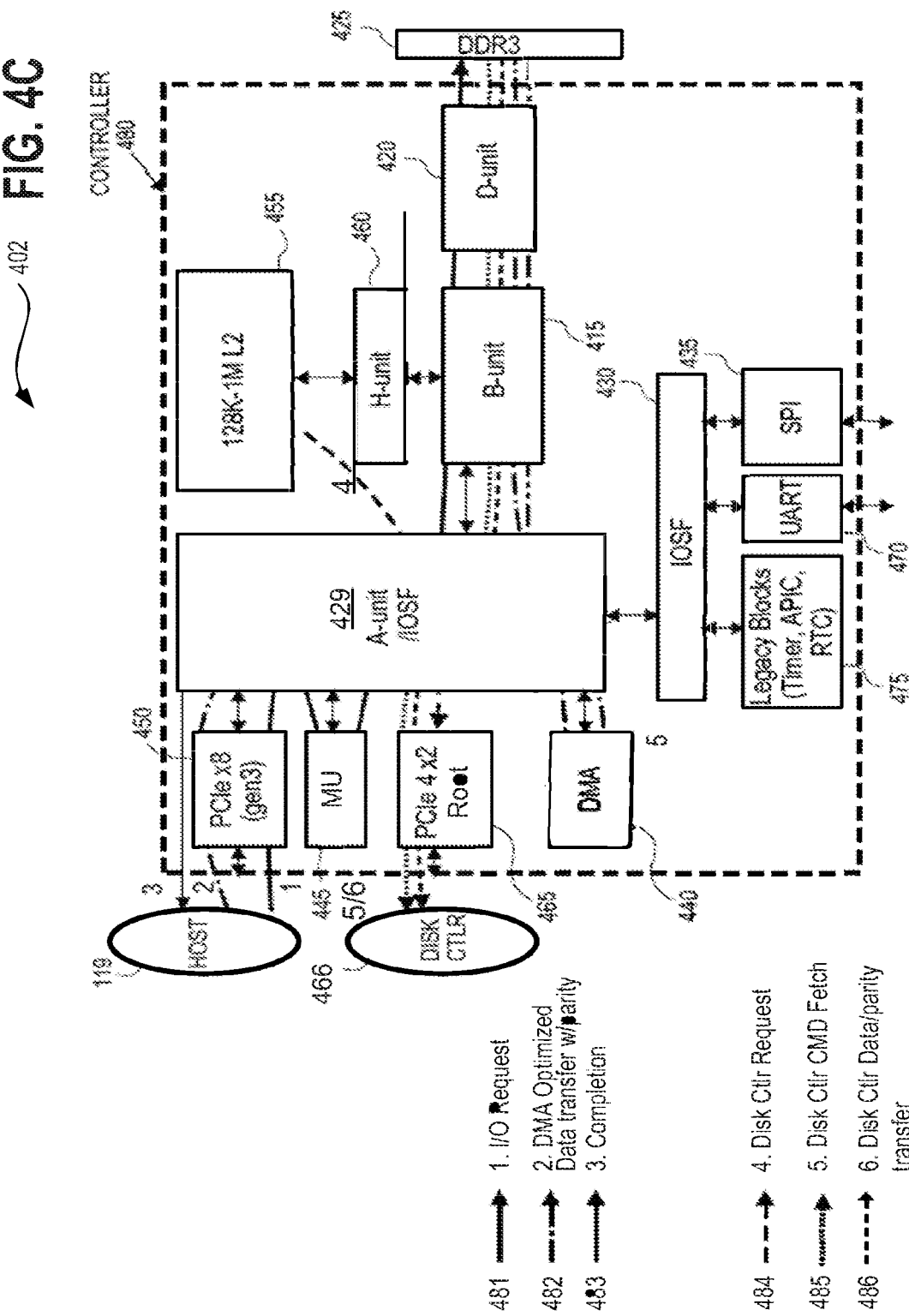

Breadth first Fill Operation requiring 32 RAID optimized descriptors with a 4K page stripe and 128K block strips for the RAID-5 3+1 disk

PERFORMANCE ANALYSIS TABLE ↙ 406

| Description (10+2) | BW (GB/s) | CBDMA MC |
|---|---|---|
| Max DRAM BW | 10.664 | |
| Efficiency | 0.7 | |
| Application Usage | 0.2 | |
| Useable DRAM BW | 5.97184 | |
| RAID-6 BW (RTF) | 1.939 | |
| RAID-6 BW (Memory) [Single Canister] | 1.57 | |
| RAID-6 BW (Memory) [Dual Canister] | 1.0296 | 1.24413333 |
| RAID-5 BW (Memory) [Single Canister] | 1.75644 | |
| RAID-5 BW (Memory) [Dual Canister] | 1.10589 | 1.35723634 |

469 — Max DRAM BW
471 — Efficiency
472 — Application Usage
473 — Useable DRAM BW
474 — RAID-6 BW (RTF)
476 — RAID-6 BW (Memory) [Single Canister]
477 — RAID-6 BW (Memory) [Dual Canister]
478 — RAID-5 BW (Memory) [Single Canister]
479 — RAID-5 BW (Memory) [Dual Canister]

FIG. 4G

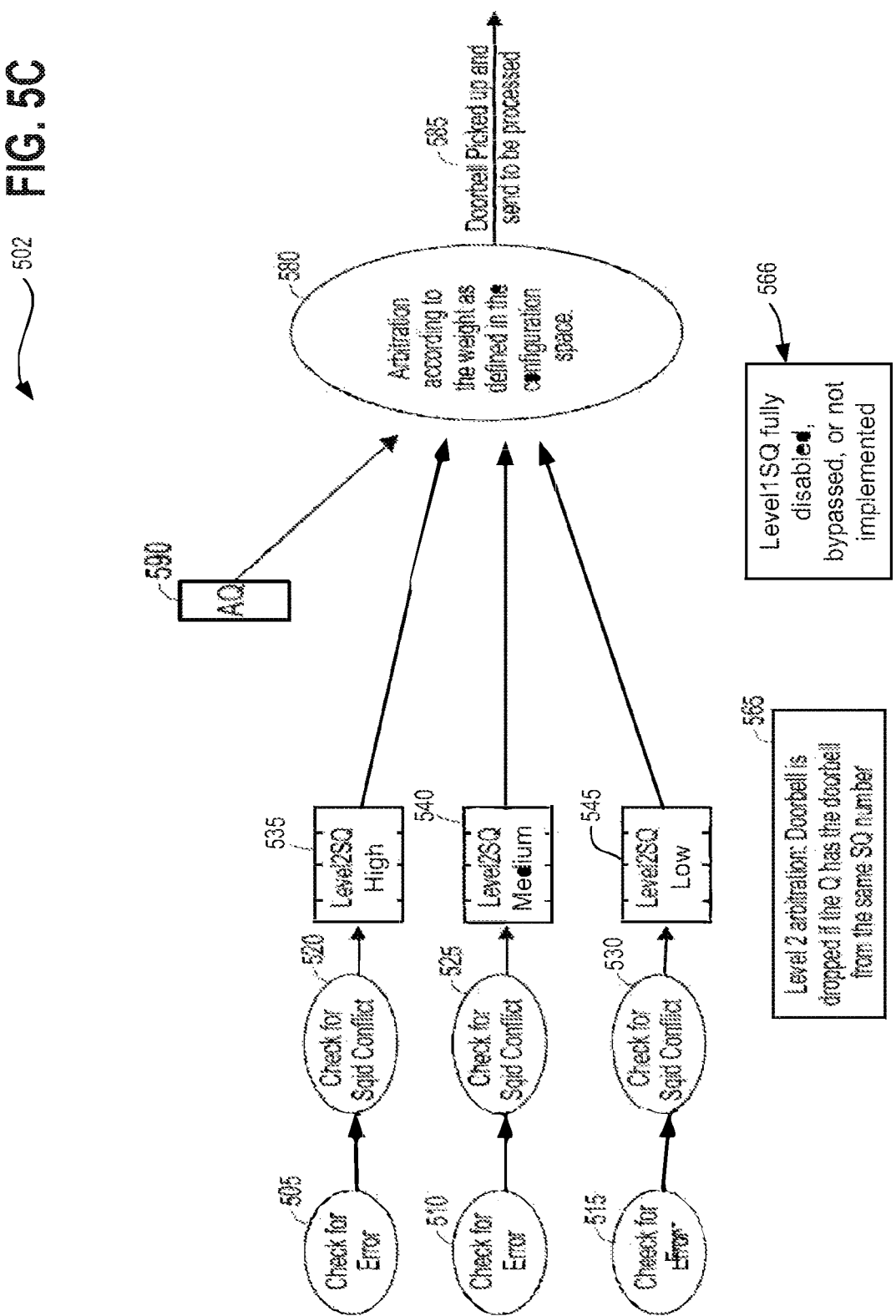

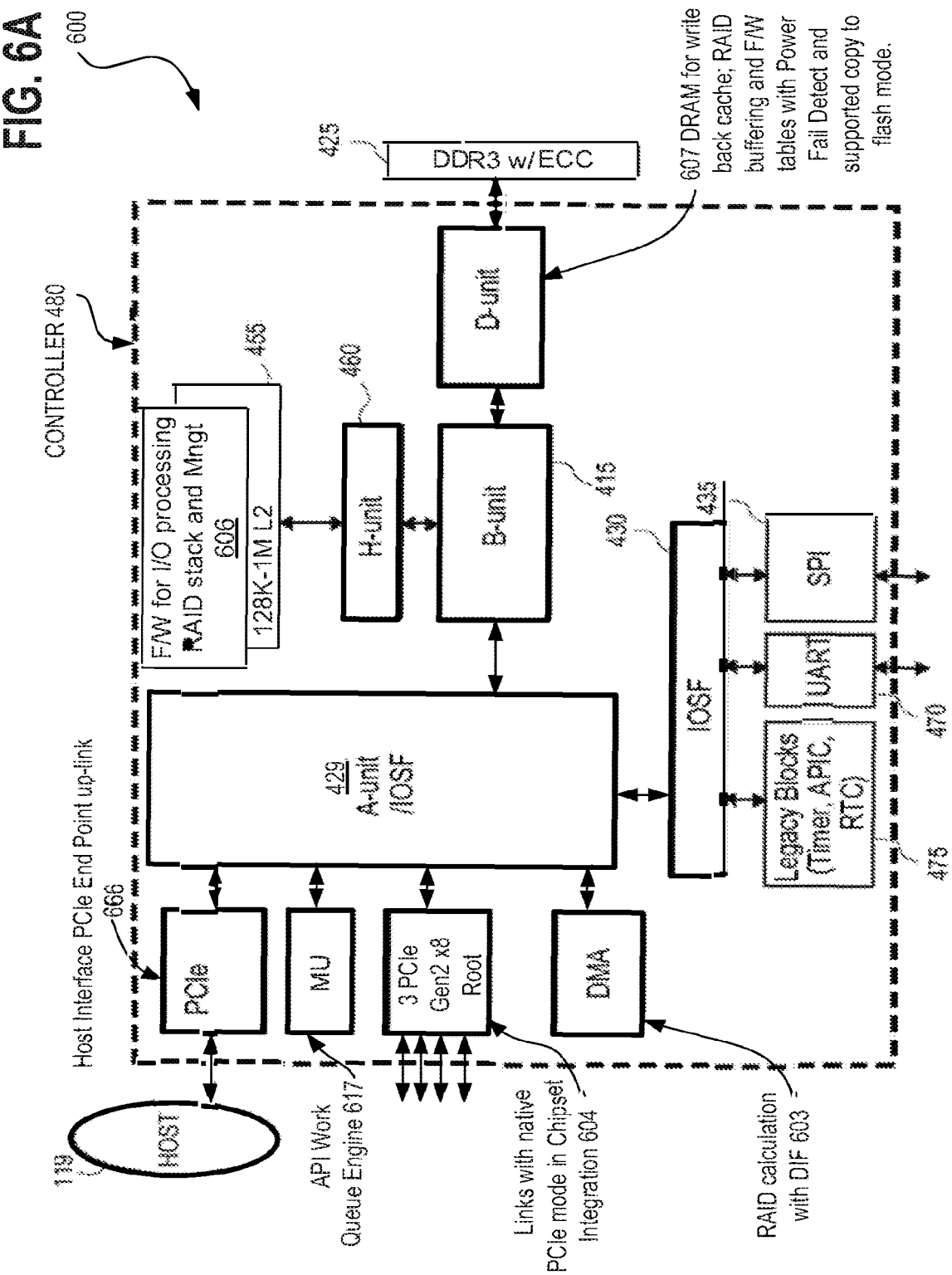

PRESENTATION OF DIRECT ACCESSED STORAGE UNDER A LOGICAL DRIVE MODEL

CLAIM OF PRIORITY

This application is a continuation of U.S. patent application Ser. No. 15/224,006, filed Jul. 29, 2016, which is a divisional of U.S. patent application Ser. No. 13/976,262, filed Jul. 24, 2013, which is a U.S. National Phase application under 35 U.S.C. § 371 of International Application No. PCT/US2011/054313, filed Sep. 30, 2011, entitled PRESENTATION OF DIRECT ACCESSED STORAGE UNDER A LOGICAL DRIVE MODEL. These applications are incorporated herein by reference in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate generally to the field of computing, and more particularly to the presentation of direct accessed storage under a logical drive model, including methods, systems, and apparatuses for implementing presentation of direct accessed storage under a logical drive model and other complementary solutions related to Direct memory access (DMA) based storage technologies, such as improved Redundant Array of Independent Disks (RAID) support, distributed RAID support, local block mirroring for improving device latency consistency, improved door bell schemes for coalescence and arbitration, as such improvements relate to DMA based storage technologies.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to disclosed embodiments.

In the computing arts, it is most common to have storage mechanisms which are directly accessed and managed by an Operating System (OS) in conjunction with a Central Processing Unit (CPU), the OS residing upon a computing device and enabled through execution capabilities of the CPU. However, alternative mechanisms also exist, such as DMA (Direct Memory Access) based mechanisms and Direct Access Storage devices which operate independently of a host and its operating system and file systems, for example, enabling access directly to hosted applications executing on the host without requiring that such hosted applications communicate access requests through the host or its operating system and/or file system.

Prior to standard storage interfaces (circa mid 1980s), programmers were required to write code to specifically handle reading and writing data from hard disk drives. Such code was required to identify cylinder, head, track and sector(s) on the hard disk drive (HDD) as part of the read and write operations. Identifying such detail as part of read and write operations to a HDD required changes to an OS in order to support any new HDD, given that the cylinder, head, track and sector(s) were inevitably different than what had been previously supported.

As standard storage interfaces, such as SCSI, ATA, SAS, SATA, FC, etc., were developed and adopted, it was then possible to hide the HDD's underlying cylinder, head, track and sector(s) layout from the programmer and present a consistent interface to the HDD, regardless of its underlying physical structure. These standard storage interfaces thus allowed programmers to simply identify a logical address in a command sent over the standard storage interface and the firmware in the hard disk drive which implemented the standard storage interface would then translate the logical address into the corresponding cylinder, head, track and sector(s) necessary to perform the read and/or write operation, move the read/write head to the correct location on the cylinder etc., and read or write the actual data per the command.

Device drivers to support these standard storage interfaces were included in operating systems so that applications residing on the OS could use standard OS calls to access any HDD via the standard storage interface, regardless of the HDD's underlying physical structure. While the standard storage interfaces and the supporting device drivers within the operating systems provided a solution to the complexities of identifying a HDD's underlying cylinder, head, track and sector(s), the standard storage interfaces and supporting device drivers themselves add complexity as well as computational overhead and therefore inefficiency which can slow performance.

The present state of the art may therefore benefit from the teachings set forth herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 3C depicts another alternative exemplary architectural overview of an architecture for implementing data mirroring to ensure consistent SSD (Solid-State Drive) latency in accordance with disclosed embodiments;

FIG. 4B and FIG. 4C depict the contrast between an un-optimized RAID 5/6 operation (4B) versus an optimized RAID 5/6 operation (4C) respectively, the optimized RAID 5/6 operation utilizing concurrent flow architecture and methodologies in accordance with disclosed embodiments;

FIG. 4F and FIG. 4G depicts a dual canister data flow for improved RAID 5/6 performance and resulting performance analysis on an exemplary RAID 5/6 10+2 configuration in accordance with disclosed embodiments;

FIG. 5C depicts another alternative exemplary architectural overview for a host to handle host doorbells in accordance with disclosed embodiments;

FIG. 6A depicts an exemplary architectural overview to implement an interrupt coalescing scheme to reduce Interrupt Service Routine (ISR) overhead and also improve RAS by notifying on error conditions in accordance with disclosed embodiments;

DETAILED DESCRIPTION

Described herein are systems, devices, apparatuses, techniques, mechanisms, and methods for the presentation of direct accessed storage under a logical drive model and other complementary solutions related to DMA based storage technologies.

In recent years with the advent of SSD (Solid-State Drive) technologies being incorporated into computer systems as mass storage devices, there is an opportunity to eliminate some of the overhead associated with traditional HDD type drives. For instance, SSD devices utilize solid state memory rather than cylinders, heads, tracks and sectors. It is therefore unnecessary for a standard storage interface to translate a logical address supplied via a programmer to an underlying cylinder, head, track and sector(s) associated with a particular read/write command Use of such translation mechanisms in the standard storage interfaces have nevertheless been maintained so as to provide backward compatibility to older legacy systems, despite the above mentioned inefficiencies. Removal or bypassing the above mentioned standard storage interfaces requires new solutions and innovation so as to enable modern operating systems to communicate with SSD based storage devices. Such solutions and innovations are disclosed via the teachings provided below, and are claimed herein.

Figure 1A:
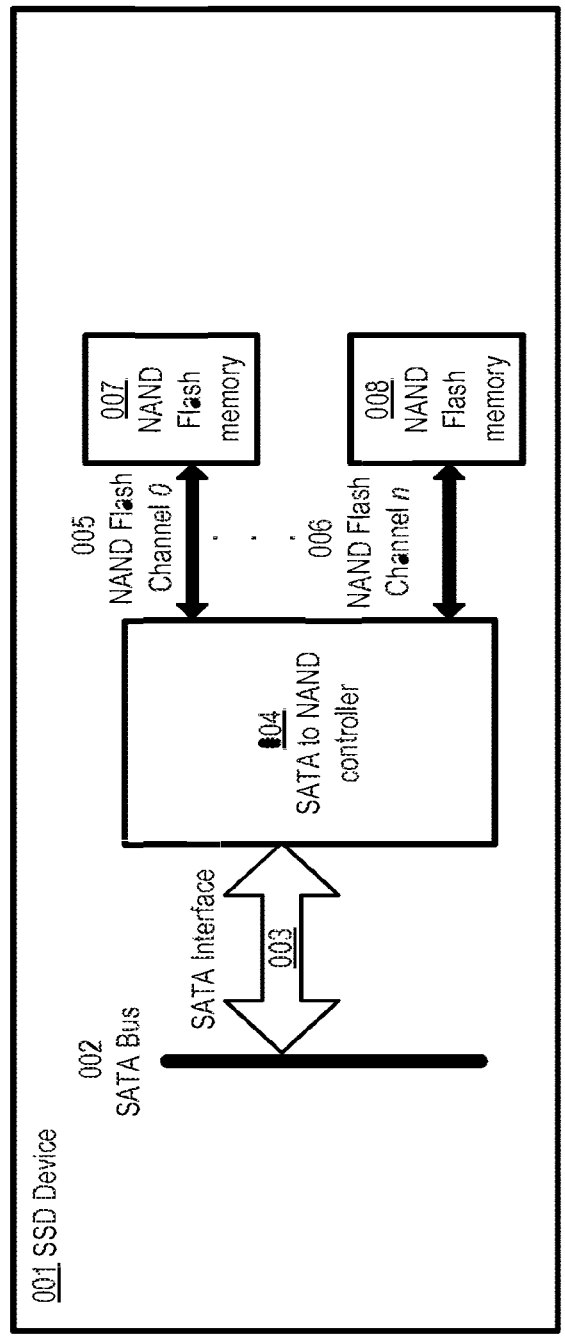
FIG. 1A illustrates an embodiment of an SSD device.

FIG. 1A sets forth an architecture 099 which illustrates an embodiment of an SSD 001 having a SATA Bus 002, a SATA Interface 003, a SATA to NAND controller 004, NAND Flash Channel 0 through NAND Flash Channel n and NAND Flash memories 007 and 008. The SATA Interface 003 is an exemplary standard storage interface. However, the SATA Interface 003 is facilitating read and write operations with the underlying NAND Flash memories 007 and 008, neither of which utilize cylinder, head, track and sector(s) type identification schemes. Additionally, the SATA to NAND controller 004 provides a further interpretation to convert SATA specific commands and instructions and addressing information into a NAND Flash memory 007 and 008 compatible scheme. It may therefore be desirable to eliminate some of the above computational inefficiencies and overhead. However, solutions and innovations must be directed toward compensating for the removal or bypass of such legacy communication schemes (e.g., standard storage interfaces and device drivers, etc.).

Direct memory access (DMA) is a feature of modern computers and microprocessors that allows certain subsystems within the computer to access system memory for reading and/or writing independently of the central processing unit and potentially independently of a hosted operating system. Systems that enable and support DMA capabilities may include, for example, disk drive controllers, graphics cards, network cards and sound cards. DMA capabilities may be beneficial insomuch as they off-load responsibility and overhead from the OS of a host computing device. However, utilization of DMA presents other problems, several of which are additionally the subject of the present application, and for which solutions are presented, taught, and claimed herein.

For instance, Applicants teach herein, solutions for 1) presentation of direct accessed storage under a logical drive model; 2) a distributed architecture for cooperative NVM (Non-Volatile Memory) Data protection; 3) data mirroring for consistent SSD (Solid-State Drive) latency; 4) solutions and methods for boosting a controller's performance and RAS (Reliability, Availability and Serviceability) with DIF (Data Integrity Field) support via concurrent RAID (Redundant Array of Independent Disks) processing; 5) arbitration and resource schemes of a doorbell mechanism, including doorbell arbitration for fairness and prevention of attack congestion; and 6) solutions and methods for multiple interrupt generation using a Messaging Unit, and NTB (Non-Transparent Bridging) in a controller.

Figure 1B:
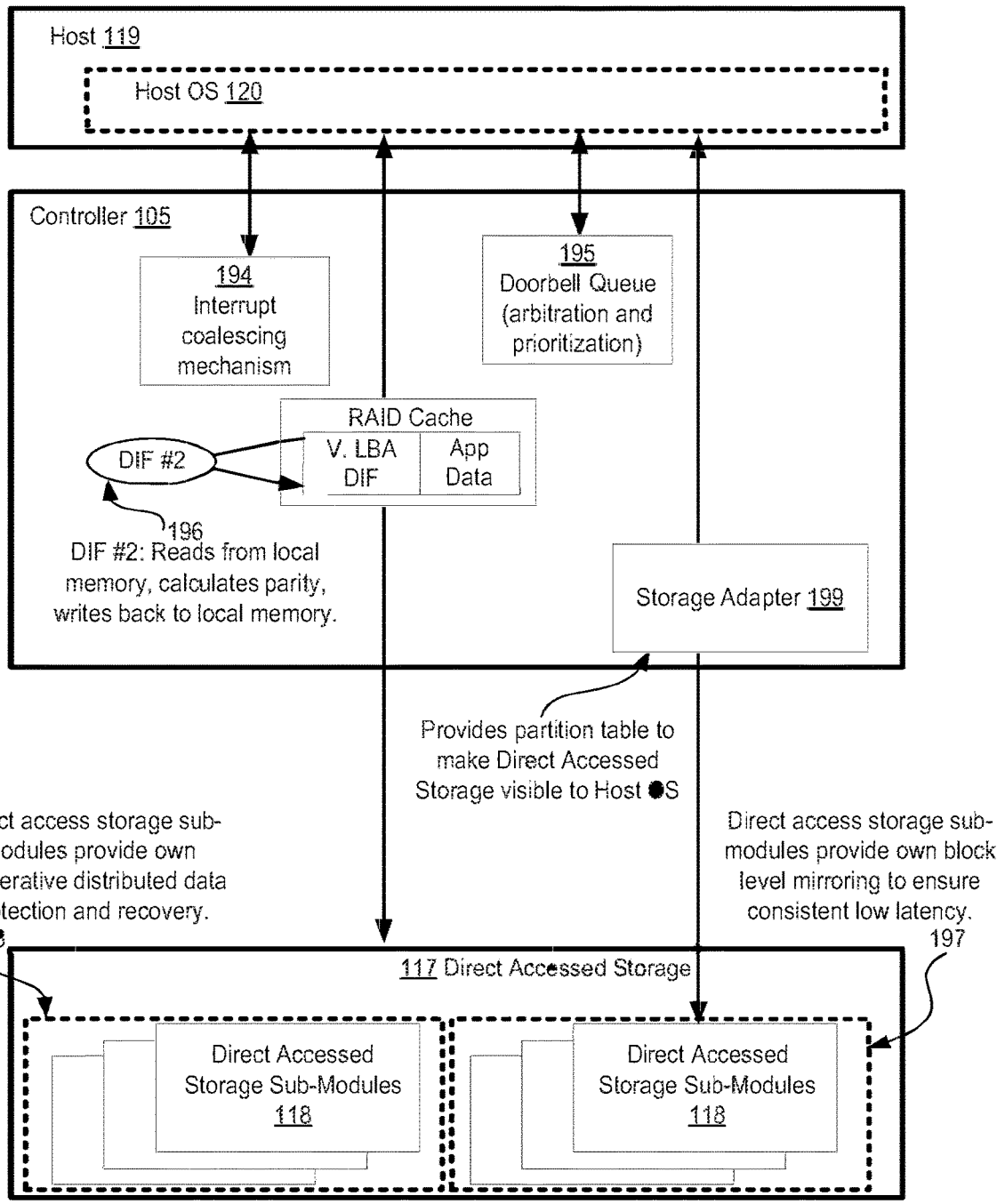
FIG. 1B illustrates an exemplary architecture in which the various disclosed embodiments may operate and to which such embodiments relate.

FIG. 1B illustrates an exemplary architecture 100 in which the various disclosed embodiments may operate and to which such embodiments relate, there is particularly disclosed herein mechanisms which include 1) an apparatus having therein an Input/Output Interface (I/O Interface) module to a direct accessed storage, and a storage adapter to provide a partition table on behalf of the direct accessed storage, wherein the partition table implements Logical Block Access (LBA access) to the direct accessed storage over the I/O Interface module; 2) a storage apparatus having therein a plurality of cooperative storage devices, each of the plurality of cooperative storage devices having therein a multicast interface to communicate with the remaining cooperative storage devices of the plurality of cooperative storage devices, an Error-Correcting Code (ECC) module, and an Exclusive OR (XOR) module, and in which the storage apparatus further includes a RAID (Redundant Array of Independent Disks) module to receive a single I/O transaction from an external device communicatively linked with the storage apparatus and to further perform multiple ECC operations and at least one XOR function based on the single I/O transaction to a plurality of data chunks striped across the plurality of cooperative storage devices via the multicast interface; 3) a storage apparatus having therein a plurality of NAND (Negated AND) based flash memory components arranged into a plurality of NAND arrays, a NAND controller communicatively interfaced with the plurality of NAND arrays, and block mirroring logic to establish a mirrored copy for each data block written to the storage apparatus, each mirrored copy to be stored within one of plurality of NAND arrays; 4) an apparatus having therein a first Input/Output Interface (I/O Interface) module to a host machine, the first I/O Interface module to receive an I/O transaction comprising data to be stored and DIF or DIX (Data Integrity Field or Data Integrity eXtension) data for the data to be stored, a DMA (Direct Memory Access) module to move the data to be stored and DIF or DIX data for the data to be stored from a memory of the host machine to a memory local to the apparatus and to concurrently calculate parity for the data to be stored based on the DIF or DIX data, and a second I/O Interface module to a plurality of storage apparatuses, the second I/O Interface module to move the data to be stored and the calculated parity for the data to be stored from the memory local to the apparatus to the plurality of storage apparatuses; 5) an apparatus having therein a work engine queue having doorbell space for queued jobs, an Input/Output Interface (I/O Interface) module to a host machine, the I/O Interface module to receive doorbell entries for submission to the work engine queue, in which a first Queue Structure within the work engine queue to release doorbell entries from the work engine queue using an arbitration scheme, a second Queue Structure within the work engine queue to release additional doorbell entries from the work engine queue using the arbitration scheme, wherein the doorbell entries are queued within and released from the first Queue structure when the number of doorbell entries in the first Queue structure is below a threshold number of Service Queue Entries (SQEs), and wherein the additional doorbell entries are queued within and released from the second Queue structure when the number of doorbell entries in the first Queue structure is above the threshold number of SQEs; and 6) an apparatus having therein a Central Processor Unit (CPU) local to the apparatus, a work engine queue having doorbell space for queued jobs, an Input/Output Interface (I/O Interface) module to a host machine, the I/O Interface module to receive doorbell entries for submission to the work engine queue, a completion queue having space to coalesce completed jobs previously queued as queued jobs in the work engine queue, and a completion queue interrupt mechanism to initiate an interrupt based on a status associated with the completion queue.

For example, FIG. 1B depicts a host 119 having a host operating system (OS) 120 therein, communicatively interfaced to a controller 105. The controller 105 is in turn communicatively interfaced with direct accessed storage 117 having multiple direct accessed storage sub-modules 118 therein. As depicted at element 199, the storage adapter within controller 105 provides a partition table to make direct accessed storage 117 visible to the host OS 120. Such a concept is described in additional detail with regard to FIG. 1D. As depicted at element 198, the direct access storage sub-modules provide their own cooperative data protection and recovery. Such a concept is described in additional detail with regard to FIGS. 2A, 2B, and 2C. FIG. 1 further depicts at element 197, direct access storage sub-modules which provide their own block level mirroring to ensure a consistent low latency. Such a concept is described in additional detail with regard to FIGS. 3A, 3B, and 3C. FIG. 1 further depicts at element 196, an operation marked DIF #2 which reads from local memory, calculates parity, and writes back to local memory to implement an improved RAID 5/6 algorithm with fewer overall Input/Output operations and is therefore more efficient. Such a concept is described in additional detail with regard to FIGS. 4A, 4B, 4C, 4D, 4E, 4F, and 4G. FIG. 1 further depicts at element 195, a doorbell queue which implements arbitration and prioritization of incoming requests to the controller 105. Such a concept is described in additional detail with regard to FIGS. 5A, 5B, 5C, and 5D. And FIG. 1 further depicts at element 194, an interrupt coalescing mechanism to reduce Interrupt Service Routine (ISR) overhead and also improve RAS by notifying on error conditions by conditionally coalescing (e.g., gathering, grouping, queuing, etc.) normal completions of requests to the controller 105. Such a concept is described in additional detail with regard to FIGS. 6A, 6B, and 6C.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

Figure 1C:
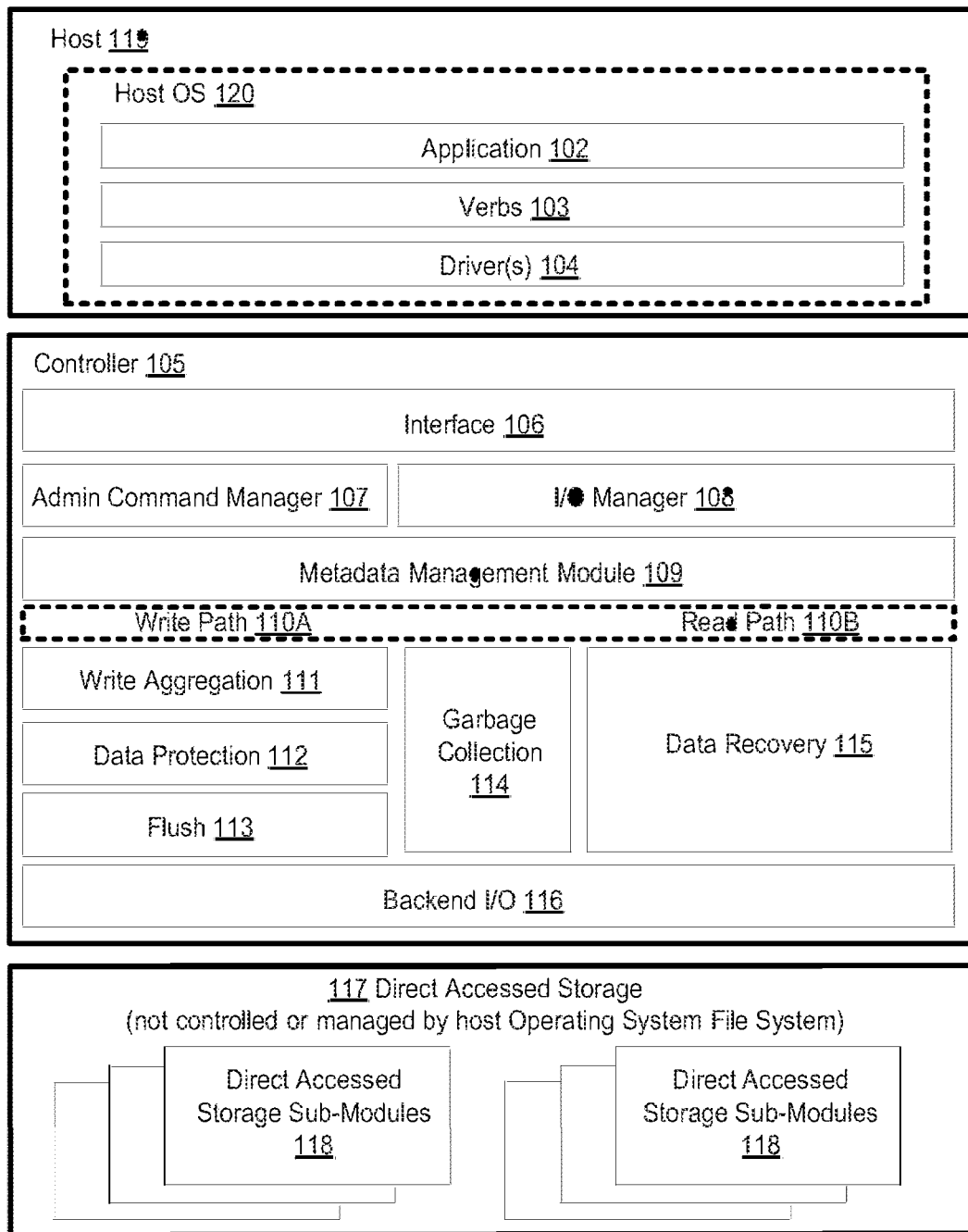
FIG. 1C illustrates an exemplary architecture in which the various disclosed embodiments may operate and to which such embodiments relate.

FIG. 1C illustrates an exemplary architecture 101 in which the various disclosed embodiments operate and to which such embodiments relate. Architecture 101 depicts a host 119 having a host operating system 120 capable to operate and/or execute thereupon, the host operating system 120 having therein, an Application 102, verbs 103, and one or more drivers 104. Further depicted is a controller 105 having therein an interface 106, an Admin (Administrative or Administrator) Command Manager 107, an I/O (Input and Output) Manager 108, a Metadata Management Module 109, Write Path 110A and Read Path 110B, Write aggregation mechanism 111, Data protection mechanism 112, Flush mechanism 113, Garbage collection mechanism 114, Data recovery mechanism 115, and Backend I/O mechanism 116. Further depicted is a Direct Accessed Storage 117 which is not controlled or managed by the host operating system's 120 file system. Within the Direct Accessed Storage 117 are a plurality of Direct Accessed Storage Sub-Modules 118 which may be of any numerous varieties, whether or not specifically exemplified herein, so long as they fit the description of non-conventional storage which is not controlled or managed by the host operating system's 120 native file system.

Figure 1D:
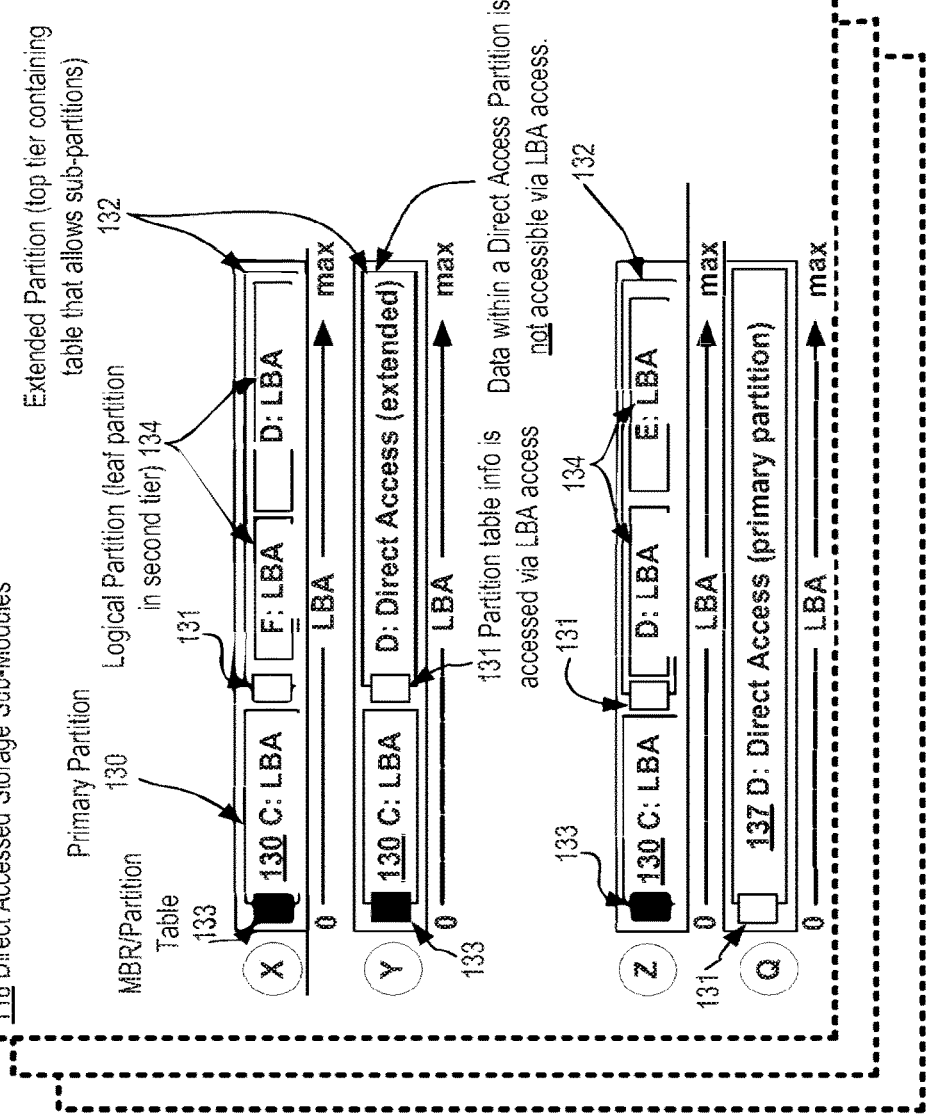
FIG. 1D depicts an alternative exemplary architectural overview of direct accessed storage and sub-modules which are enabled for presentation to a host operating system under a logical drive model in accordance with disclosed embodiments.

FIG. 1D depicts an alternative exemplary architectural overview 102 of direct accessed storage 117 and sub-modules 118 which are enabled for presentation to a host operating system 120 under a logical drive model in accordance with disclosed embodiments.

In accordance with disclosed embodiments, presentation of direct accessed storage under a logical drive model provides a mechanism by which to present storage space that is used for direct mapped storage 118 as a logical volume, thus enabling the space to appear in standard operating system tools and views. The terms "direct accessed storage" and "direct storage" as used herein refer to storage 118 that is accessed without going through such an Operating System's native or internal file system support.

A standard OS-readable drive partition 130 is provided which is accessible as block storage and used to present a logical volume (drive) (e.g., via LBA 134) that represents the existence of direct storage and the amount of storage space that is allocated to direct storage. Such a technique results in "direct mapped storage."

Direct accessed storage 117 provides storage that is directly accessible by applications as well as the OS. However, direct accessed storage 117 is not organized using a standard file system, such as an NTFS (New Technology File System). If the storage space does not appear as a logical volume (e.g., LBA 134) to the OS 120, then standard tools. such as natively supported tools of the host Operating System 120, cannot be used to see whether direct accessed storage 117 even exists, nor can the Operating system determine how much storage space has been allocated for the direct accessed storage 117, how much space is available, how much space is presently utilized, and so forth.

Non-conventional storage, such as storage that is not shown using logical drives, is thus made accessible to traditional utilities familiar to a host operating system, whilst simultaneously enabling the benefits for which such non-conventional storage was chosen and implemented by the designer of the hosting computing device upon which the Operating System operates and executes.

Presently available solutions provide no mechanism whatsoever by which a region of direct accessed storage 117 which is not directly accessible through the operating system's native file support capabilities and utilities may appear in standard operating system tools and views. Moreover, presently available solutions provide no mechanism whatsoever by which such non-conventional storage (e.g., direct accessed storage) can be partially or wholly accessed as logical block accessed (LBA) storage 134. Further still, presently available solutions provide no mechanism whatsoever by which partition data (e.g., metadata in a MBR/Partition table 133 or Logical Partition 131) can be made available to a host operating system, in which the partition data represents the presence and amount of storage used for direct storage which is otherwise unavailable and therefore, effectively invisible, to the host operating system 120, absent the techniques described herein.

The described techniques may be further extended through the use of a storage device or array 132 that provides a combination of LBA and Direct Accessed Storage 117 where both types of storage are enabled to appear as logical volumes coming from the same storage device or storage array.

The use of standard partitions in combination with providing a logical-block accessed (LBA) compliant device 134 corresponding to the direct accessed storage device to enable standard OS tools to directly read and interpret the partition data without requiring modification or augmentation of the OS tools is of particular benefit as reverse compatibility may be provided without having to overhaul such a host Operating Systems familiar tools used to manage, access, and view traditional storage space under the control of the Operating System. Without such a mechanism, the amount of storage used for direct access would not be visible to the user using the standard OS tools (without overhaul of the OS). For example, if the user has a 500 GB (gigabyte) storage device where 200 GB was used for LBA storage and 300 GB for Direct Access storage, only the 200 GB used for LBA storage would appear under the standard OS tools for disk management, leaving the remainder effectively invisible to the user and to the OS, absent the described techniques.

These techniques may be utilized specifically to accommodate the way certain FLASH Drives are managed or mapped, as well as other medium types of direct accessed storage 117.

An adaptor for the direct accessed storage 117 (e.g., such as a storage adapter 199 provided via, for example, a controller 105 or other capable device) provides a partition table 133 on behalf of the direct accessed storage 117 where the partition table 133 is accessed using logical block access (LBA) 131 by the host OS 120. The logical storage device 134 provided by the controller 105 or an equivalent mechanism includes at least a small portion of LBA storage, even if the bulk of the direct accessed storage 117 is used for direct access storage only, such as that depicted by example Q in which the vast majority of the direct access storage 117 remains as direct accessed storage 117 with only a very small portion presented to the host OS 120.

The presentation of the direct accessed storage 117 as a foreign file system helps prevent the host OS 120 from attempting to access the associated data. The partition data for the storage would typically be kept on the storage device itself, although it is possible that it could also be synthesized by the direct accessed storage driver (e.g., drivers 104 or other appropriate drivers).

The advent of direct accessed storage 117 carries with it a learning curve which may present barriers to adoption of the technology. The embodiments described herein enable the usability of the direct accessed storage 117 solutions by making them technologically compatible with existing models for hard drive and RAID (virtual drive) management under the host OS 120, thus making direct accessed storage 117 more readily comprehensible and acceptable to users, be they end-users of a computing device or designers of such host 119 computing devices.

The disclosed techniques may be implemented and in accordance with some embodiments, be implemented at least partially via data that is stored on the direct accessed storage 117 and communicably links/interfaces/hooks to a storage adapter 199 implementation be it within a controller 105 or otherwise. Moreover, open source software and third-party interfaces and solutions may be utilized to access the implementing data, may be used to access the storage of the data on the medium utilized for the direct accessed storage 117, and may utilize mechanisms which collectively provide the described features, subject to appropriate rights, permissions, and licensure.

Figure 2A:
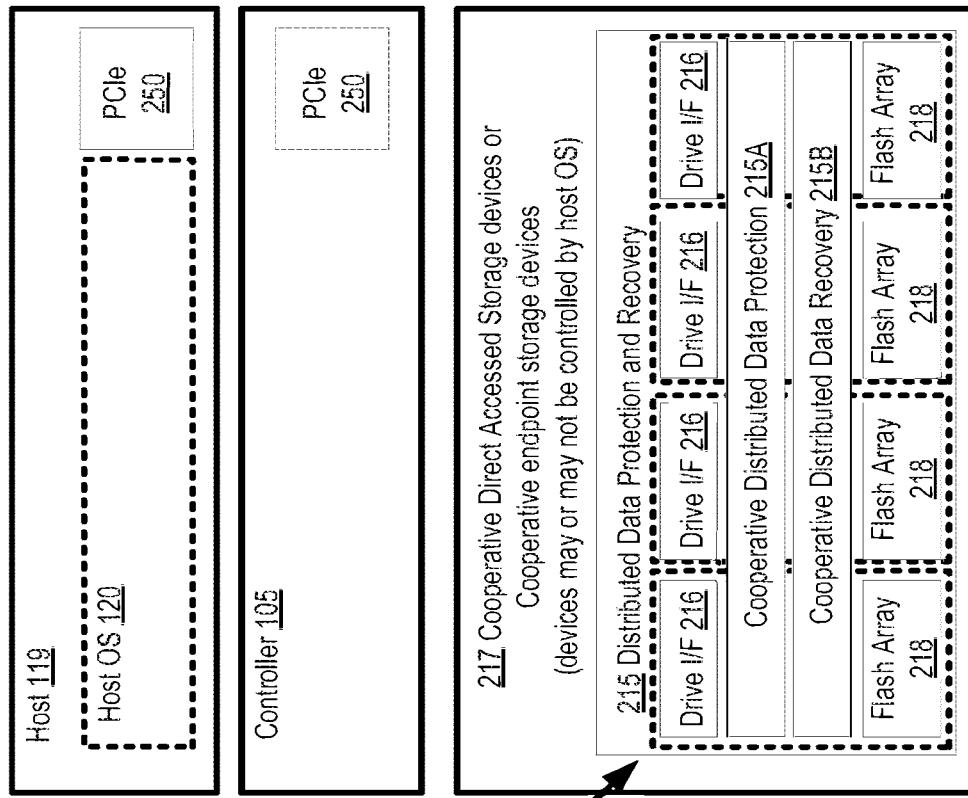
FIG. 2A depicts an exemplary architectural overview of a distributed architecture and complementary methodologies for implementing cooperative NVM data protection and recovery schemes in accordance with disclosed embodiments.
Figure 2A:
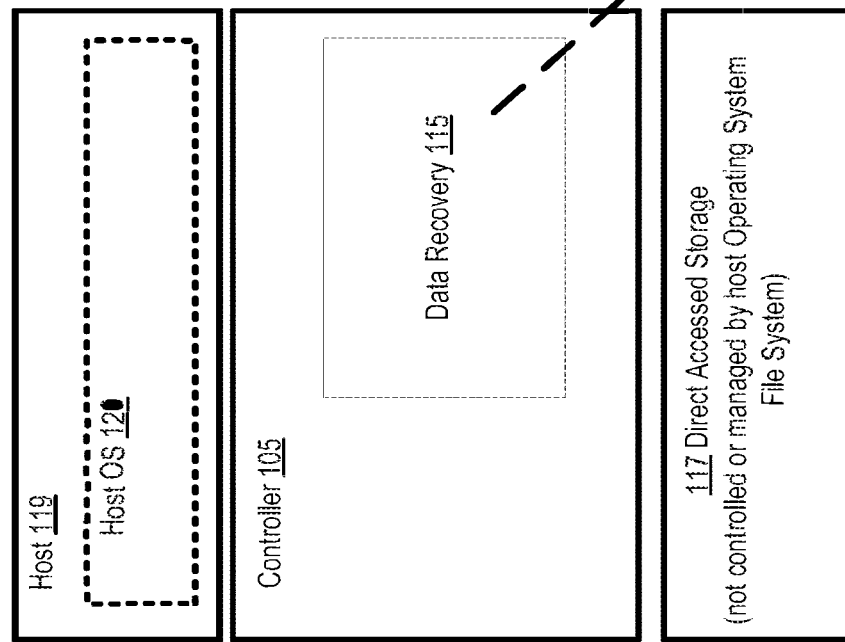

FIG. 2A depicts an exemplary architectural overview 200 of a distributed architecture and complementary methodologies for implementing cooperative NVM data protection and recovery schemes via a set of endpoint storage devices operating as cooperative direct accessed storage devices 217 in accordance with disclosed embodiments. Although discussed with regard to particular storage medium types, the disclosed embodiments may generalized to NVM or to any other type of storage (such as spinning media) with the same basic advantages.

In accordance with disclosed embodiments, Distributed Architecture for Cooperative NVM (Non-Volatile Memory) Data Protection provides a mechanism to ensure data protection and further to distribute the task of data protection and data recovery 215 amongst a community of solid state drives (SSDs), such as storage apparatuses. The disclosed mechanism and exemplary embodiments exploit features of PCIe (Peripheral Component Interconnect Express) 250, including, for example, multicast capabilities of PCIe 250, and thus, is enabled to leverage the I/O fabric between a host 119 and PCIe 250 based or PCIe 250 compatible SSDs. Although PCIe 250 is described as an example, any communication medium that provides multicast capabilities may implement the disclosed embodiments. For example, Internet Protocol (IP) based storage systems which support multicast capabilities and cooperative communication schemes may benefit from the described techniques.

A data protection and recovery 215 architecture and complementary mechanisms are disclosed which distribute the functionality among a community of SSDs. Since SSDs incorporate both ECC (Error-Correcting Code) and XOR (Exclusive OR and/or XOR gate) operations, such an approach reuses existing hardware and pushes the responsibility of data protection and recovery 115 on a host or on a controller to a storage device 299 or SSD capable of implementing distributed data protection and recover 215 as the acceleration already resides within such PCIe 250 based or PCIe 250 compatible SSD devices and storage devices 299.

Through the practice of such disclosed embodiments, RAID may further be implemented in a distributed fashion over the architecture, thus offloading data recovery 115 responsibility from a host 119 to the host's 119 endpoint drives operating as a storage device 299 capable of performing the distributed data protection and recovery techniques 215. In previously available data protection architectures, the host 119 aggregates data in order to generate XOR protection information and writes bands' over the set of drives. A band is a set of data per drive as well as a protection strip that is written to a drive, in which each band includes a data protection strip written to a different drive (e.g., not a drive storing the original data or portion of data) to level the protection data across the drive set.

Disclosed herein is a mechanism by which XOR protection information is not generated or checked by the host 119 or even a controller 105 or other controller implementing DMA storage techniques for communication with direct accessed storage devices 117, but instead is checked by the distributed PCIe based or PCIe compatible SSDs and storage devices 299 themselves. More particularly, the responsibility for performing and ensuring such XOR protections is off-loaded from the host 119 or a host RAID controller and onto the endpoint PCIe based or PCIe compatible SSDs storage devices 299.

For each band write across the PCIe based or PCIe compatible drive set, the host 119 or host OS 120 determines which drive will act as the data protection strip for that particular band. In one embodiment, the host 119 writes each drive strip (e.g., each drive's representative portion set for the band) to its representative drive and also to the protection drive via PCIe multicast. Such an approach allows each targeted PCIe based or PCIe compatible drive to receive its data for storage, but also enables the currently designated protection drive for that write sequence to receive the data necessary for XOR generation. As part of the write transaction, each drive knows whether it's a data-store drive for that particular transaction or conversely, an XOR generation target drive in which case it serves as the designated protection drive for that particular write transaction (e.g., each drive may be signaled by the host 119 as to is role for that write transaction as data-store or XOR generation, or derive its appropriate role from, for example, a header, flag, or other appropriate messaging operation).

For the data-store target drive(s) specifically, the write transaction is simply stored in the drive so as to store the data directed to the particular target data-store drive.

For the XOR generate target drive however (e.g., the designated protection drive for the band), the drive collects the data necessary to perform XOR generation (all other data within the band), and then awaits the next multicast write request to perform the XOR generate operation based on the collected data. RAID module 298 (FIG. 2B) may coordinate the XOR generation. The data necessary for XOR generation is simply all other multicast received data for the band, seen by the XOR generate target drive as a benefit of the multicast scheme.

In an alternative embodiment, a host 119 or a controller 105 writes a single I/O transaction to the storage device 299, and the RAID module 298 of the storage device chunks the data of the write transaction as appropriate and initiates the multi-casting function so that all drives receive the necessary data chunks and such that the XOR targeted drive can generate XOR data based upon the data chunks seen by virtue of the multicast operation.

Take for example a 3+1 RAID set in which three multicast writes are performed. In such an example, the three drives receiving data as targeted or designated data-store drives and the one/single designated protection drive receiving/collecting each of the writes via multicast for the purpose of generating or calculating XOR from the data associated with the three writes targeted to the data-protection drives, but "seen" or visible to the designated protection drive through the virtue of the multicast operation, thus resulting in the XOR generation or calculation of RAID parity data appropriate for storage as the data protection strip upon the designated protection drive for that particular band write transaction.

As noted above, such a scheme offloads computational burden from the host 119, as the host 119 its OS 120, its operational software, even a RAID 298 controller for the host is not necessary to calculate parity data, as the burden is distributed to a designated protection drive or storage device 299 for that band write transaction which already possesses such a capability natively (e.g., such as the exemplary SSDs devices noted above which internally generate XORs over channels). The host 119 may designate different available drives as the protection drive for each of a plurality of such write transactions based on different methodologies, such as round-robin, or in view of an I/O load for such a drive, any queue times for such drives, or other characteristics as appropriate or the RAID module 298 within such a storage device 299 may coordinate the selection and designation of data target drives and XOR parity calculation target drives.

Because previously available solutions required that data protection and recovery be performed by the host 119 or its host OS 120 software, it was necessary to provide sufficient acceleration of XOR calculations so as to prevent a bottleneck or performance degradation of I/O based operations. Where hardware acceleration was not available with such prior techniques, software algorithms must be provided with significant performance reduction for the host 119 due to an extreme computational burden on the host's 119 processor(s).

Because the disclosed architecture and techniques pushes data protection and recovery burdens to the drives or storage devices 299 themselves via the multicasting of data to the target data-store drives, the RAID module 298 is enabled to calculate or have calculated appropriate parity data at the drives and then store such parity data. Through such techniques, significant performance increases can be attained without the host 119 having to implement any particular hardware acceleration mechanism for host 119 based XOR calculations or controller based XOR calculations. In one embodiment, write data is tagged with band information such that the available drives can autonomously generate XOR data, deriving their role designation from tagged data (e.g., as a data-store target drive or a designated protection drive for a particular write transaction, revolving around the drives with an appropriate methodology to minimize read performance degradation issues.

Data recovery operations, when necessary, may also performed at the drive level, absent the host having to perform XOR reconstruction operations. For example, where the available drives communicate with their peer drives in a peer-to-peer fashion, the peer drives are enabled to reconstruct data using XOR prior to submitting data back to the host, thus utilizing the distributed capabilities of the available drives to perform such data recovery capabilities and therefore, offloading such responsibilities from the host 119.

Conversely, presently available solutions centralize the job of data protection and recovery at a single entity, typically the host 119, its host OS 120, or even centralized via a host RAID controller. The techniques described herein do not centralize such burdens, but instead, distribute the load of the work/computational overhead to the endpoint drives, working in a cooperative fashion, thus permitting RAID protection with host offload, and further providing important valued-added features capable devices, such as the exemplary SSD type storage devices 299 disclosed herein. For example, the exemplary SSDs support multicast 294 (FIG. 2B) for PCIe which may be used to distribute data to the endpoint SSD storage device 299 and further support the ability to perform peer to peer transactions between the SSD drives for the purposes of data recovery (e.g., reading data for the purpose of XOR reconstruction of missing data), and thus, permit generation and storage of RAID parity on a designated protection drive to efficiently calculate and place XOR parity/protection data onto the designated endpoint drive on a rotational basis over multiple write transactions (or to provide data-recovery from utilizing the previously store XOR parity/protection data when necessary).

The data recovery mechanism 115 depicted at FIG. 1C is off-loaded from the controller 105, or offloaded from a host 119 as the case may be, and distributed instead to the direct accessed storage devices 117 depicted in FIG. 1C and operating as cooperative direct accessed storage devices 217 as set forth now in FIG. 2A within storage apparatus 299. In one embodiment, direct accessed storage device(s) 117 includes one or more underlying flash arrays 218 or flash memory components upon which underlying non-transitory storage capability is provided. Each such flash array 218 has a complementary Drive I/F (Interface) 216 via which the underlying flash array 218 may be communicated with.

For example, in place of host 119 based firmware or host OS 120 based software as set forth in FIG. 1C, the functionality to provide data protection and recovery operations 115 is offloaded to the cooperative direct accessed storage devices 217 which enable the above described distributed data protection 215A and data recovery 215B methodologies.

Figure 2B:
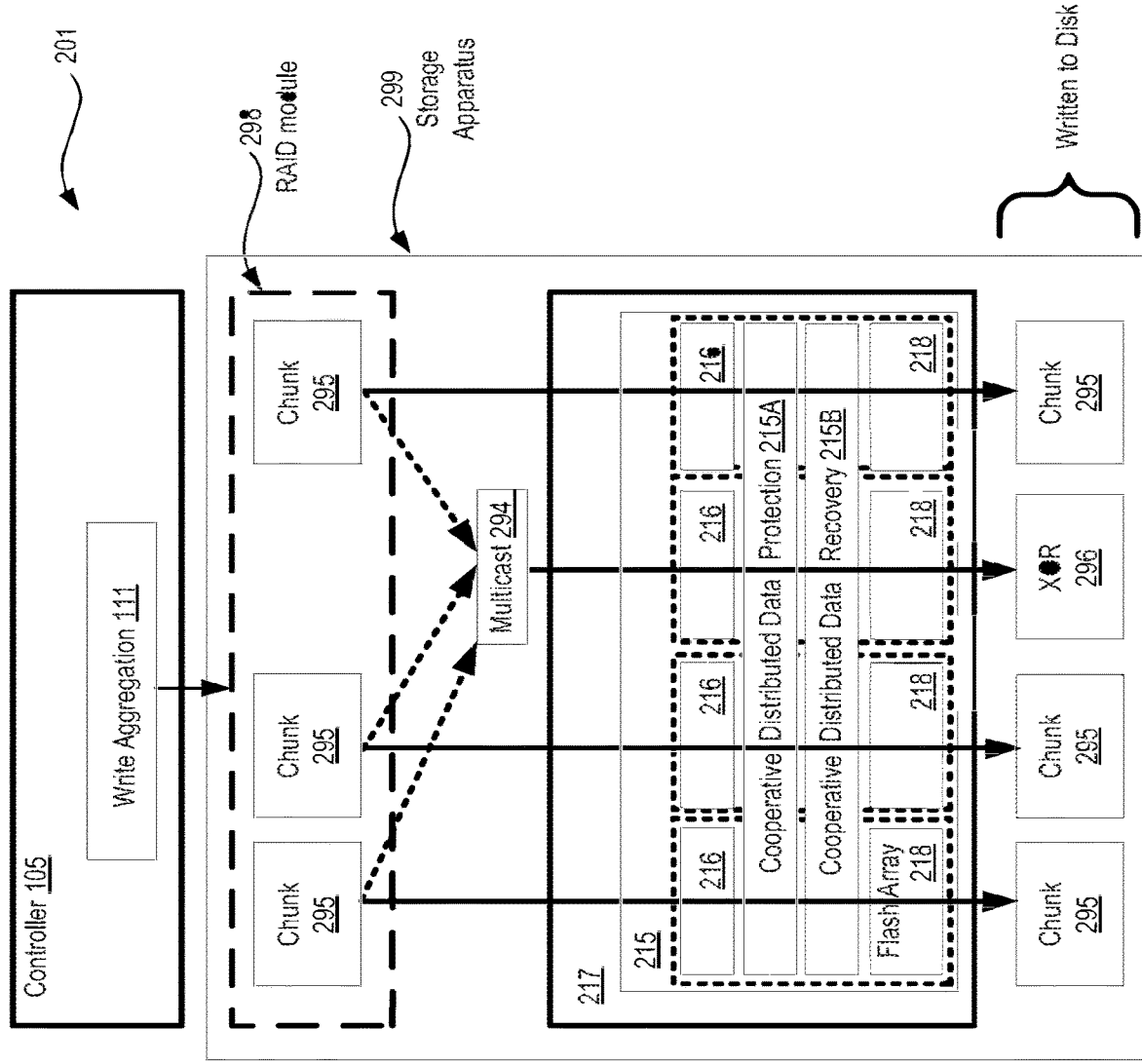
FIG. 2B depicts an alternative exemplary architectural overview of a distributed architecture and complementary methodologies for implementing cooperative NVM data protection and recovery schemes.

FIG. 2B depicts an alternative exemplary architectural overview 201 of a distributed architecture and complementary methodologies for implementing cooperative NVM data protection and recovery schemes.

FIG. 2B depicts a more detailed representation of the cooperative data protection scheme as provided by the cooperative direct accessed storage devices 217. For instance, in the example shown, the third drive is designated as the protection drive or the XOR drive 296 for this band and receives all chunks as part of a PCIe multicast operation. To be clear, the designated protection drive/XOR drive 296 receives and collects (e.g., "sees") all the data sent to the targeted data-store drives, despite not being an explicitly targeted data-store drive. All other drives acting as data-store drives receive and store their chunks 295 in their flash arrays 218 (or applicable underlying non-transitory physical storage medium) and the third drive, in this particular example for this particular write transaction, constructs the XOR chunk from the collected multicast data received and stores the generated XOR chunk its own flash arrays 218 as depicted by XOR 296 stored thereupon. Note that the XOR drive changes/rotates with each transaction so as not to degrade overall read performance of the available drives.

In one embodiment, a RAID module 298 provides chunking capabilities of data into the plurality of chunks 295 and further initiates appropriate multicast 294 operations in a coordinated effort with the cooperative direct accessed storage devices 217. The RAID module 298 as well as the cooperative direct accessed storage devices 217 are integrated into a single storage apparatus 299 in accordance with on embodiment, such as within an SSD device. Data may arrive from, for example, a write aggregation mechanism 111, such as that shown within controller 105.

Figure 2C:
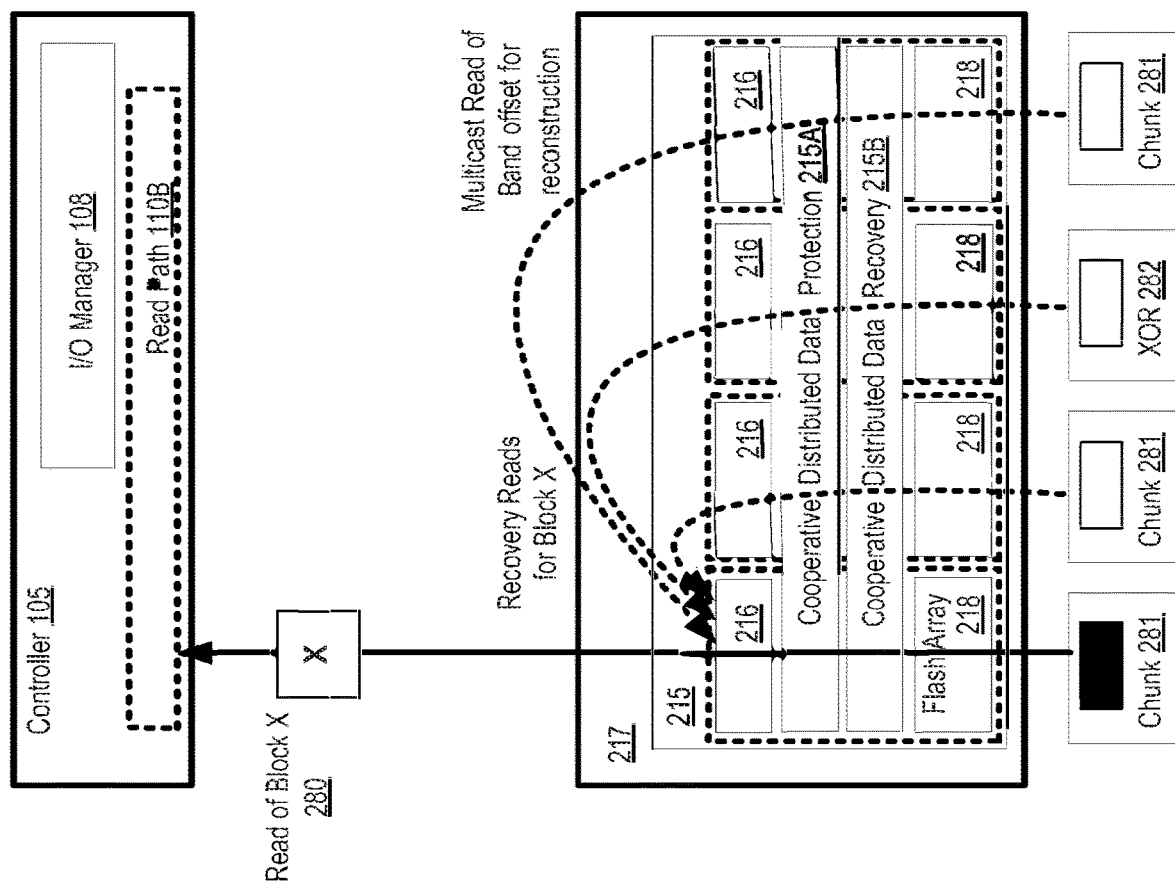
FIG. 2C depicts another alternative exemplary architectural overview of a distributed architecture and complementary methodologies for conducting cooperative data recovery schemes.

FIG. 2C depicts another alternative exemplary architectural overview 202 of a distributed architecture and complementary methodologies for conducting cooperative data recovery schemes.

FIG. 2C depicts an exemplary data recovery path that is performed entirely within the community of drives, again, by distributing such burden to the community of available endpoint devices and offloading such computational burden from the host 119. In this example, a read 280 to one of the drives identifies a failure (block corruption, or other error) which necessitates a repair for the faulty block read 280. The read may be initiated via read path 110B within, for example, a controller 105. The drive which encountered the faulty block read 280, such as the blackened chunk 281, responsively issues a multicast read to the community of drives, each of which respond with their corresponding part of the data based on the particular stripe being read. Shown here, two data chunks 281 are returned via multicast and an XOR chunk 282 having calculated parity data necessary for recovery of the faulty data chunk (blackened chunk 281) is also returned. The drive which encountered the error or faulty block read then reconstructs the data and returns the reconstructed/recovered data host 119 or to the requesting user or application as appropriate. In some embodiments, the drive additionally returns a message or indication that a read failure occurred, either piggybacked with the response, or as a separate notification.

In addition to the capability to provide such features via distributed endpoint devices operating as cooperative direct accessed storage devices 217, the described techniques may further service to reduce cost and complexity of a host 119 due to such a host 119 no longer requiring its own RAID based capabilities via hardware acceleration, software, or a controller, and the described embodiments further introduce additional value to capable SSD devices or other compatible endpoint devices through their ability to provide such cooperative data protection features. Further still, the computational load is load-balanced across multiple devices due to the distributed nature of the embodiments disclosed, thus potentially provided improved performance and speeds over centralized based (e.g., host 119 based) solutions. Yet further still, the distributed approach which leverages the endpoint devices also minimizes the amount of data communicated within a PCIe fabric, thus improving I/O performance through a reduction of contention for the PCIe fabric resources. For example, writes are multicast to the target drive and the data protection drive rather than being individually sent for any particular chunk 281, thus, in a 3+1 RAID configuration such as that described above, there would be only three (3x) multicast writes performed instead of four (4x) typical non-multicast writes in which the fourth non-multicast write is the XOR chunk directed toward a designated parity drive or protection drive for that particular stripe write.

Because the data recovery burden is also offloaded from the host 119, when a drive detects that an internal data error has occurred (e.g., through its native internal parity), the drive at issue reads data from the peer drives in the set to respond to the issued read request and additionally automatically updates its data locally to correct the for error, again resulting in a lessened burden not just upon the host 119 but also a lessened I/O burden to the PCIe fabric.

In yet another embodiment, drive rebuilds are also offloaded from the host 119 and are also performed in a distributed and cooperative fashion via the cooperative direct accessed storage devices 217. For example, in a traditional RAID systems, the host 119 enters a rebuild mode to read data from all remaining drives in the RAID set, then regenerates the missing data, and then writes the missing data back onto the new drive which is being re-constructed. Such a process creates an enormous computational burden on the host 119 and upon the communication interface between the host 119 and its storage.

Conversely, in accordance with the disclosed embodiments described herein, each of the cooperative direct accessed storage devices 217 in the set cooperatively performs the rebuild for the new drive (each drive agrees or coordinates which chunks 281 it will regenerate for the new drive being reconstructed). In such a way, each of the cooperative direct accessed storage devices 217 performs a multicast read to the other drives in the RAID set to rebuild the missing data which is then written to the new drive, all of which may be performed without involving the host 119, and thus, there is no computational burden applied to the host 119 which may therefore carry out other operations. Because the reconstruction of a drive occurs via each of the remaining cooperative direct accessed storage devices 217 in the RAID set, the reconstruction occurs faster and minimizes the rebuild window, thus further reducing the risk of a dual-failure mode syndrome, and thus, potentially permanent data loss or non-recoverable data loss via that raid set (e.g., where "P" mode syndrome data is stored without additional "Q" based parity for dual syndrome recovery). For example, where a drive fails or is replaced with a drive to be re-constructed, there is not sufficient data present to reconstruct a second drive owing to a second failure if such a second failure occurs before the new drive is completely reconstructed. Thus, any decrease in reconstruction time reduces the risk of a dual syndrome failure situation.

Figure 3A:
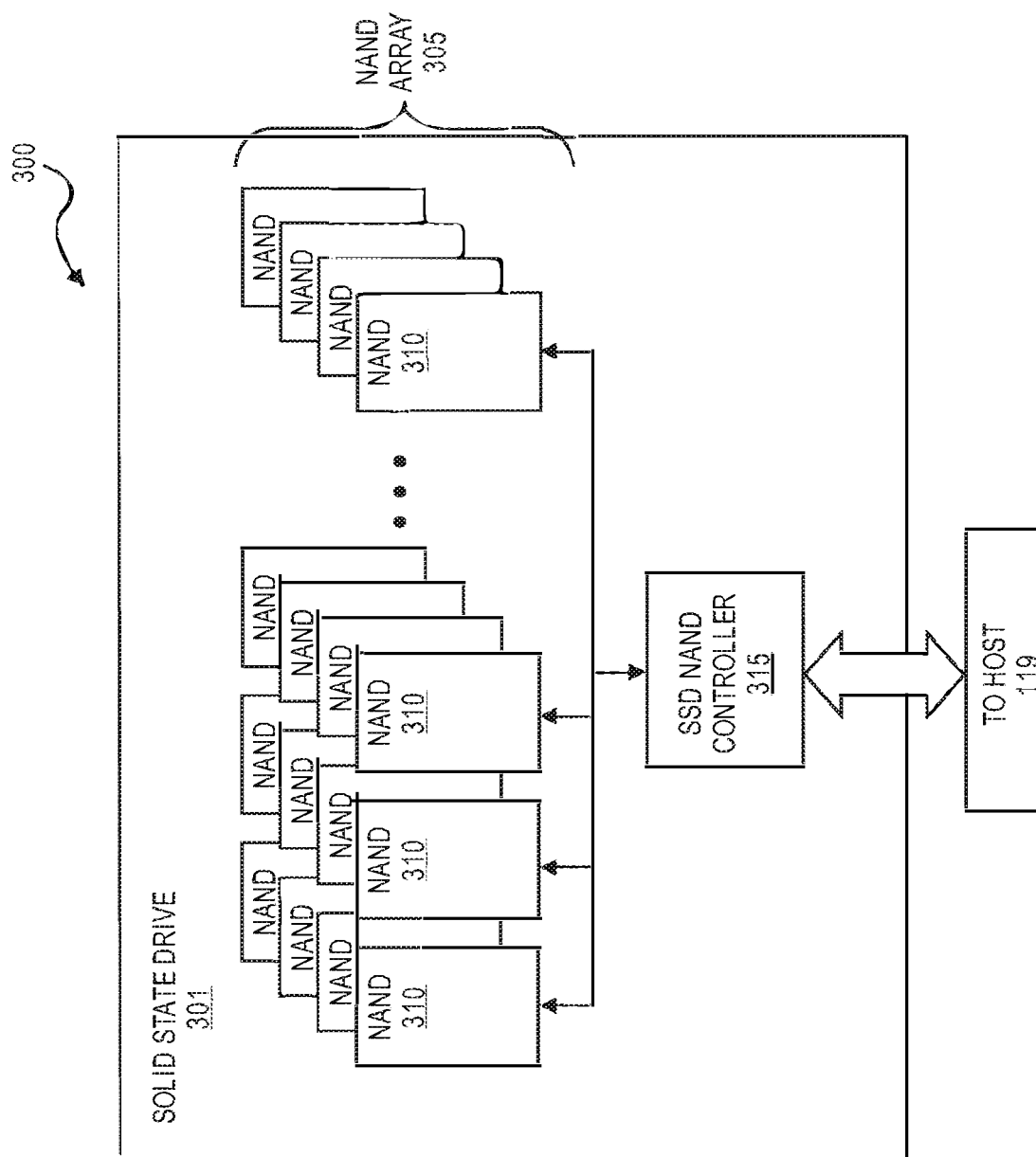
FIG. 3A depicts an exemplary architectural overview of an architecture for implementing data mirroring to ensure consistent SSD (Solid-State Drive) latency in accordance with disclosed embodiments.

FIG. 3A depicts an exemplary architectural overview 300 of an architecture for implementing data mirroring to ensure consistent SSD (Solid-State Drive) 301 latency in accordance with disclosed embodiments. The SSD devices depicted may operate as direct accessed storage devices 117 in accordance with disclosed embodiments or may alternatively operate as NAND 310 based SSD 301 endpoint storage devices operating under the control and management of the host 119 or the host OS 120, in accordance with disclosed embodiments.

In accordance with disclosed embodiments, data mirroring for consistent SSD (Solid-State Drive) latency provides a mechanism to ensure consistent latency and data mirroring via Solid State Drives (SSDs) 301 which deliver lower latency storage than mechanical Hard Disk Drives (HDDs).

NAND (Negated AND or Negated AND gate) 310 based flash memory is one type of underlying non-transitory physical storage media utilized for SSDs 301. Presently available NAND 310 technology requires some management overhead for it to be used for storage. For example, large blocks of the device must be erased at one time so that new data can be written to the NAND device. Performing a block erase takes a long time and while the erase operation is underway, the NAND device is incapable of allowing any access to data on the device during such an erase period (e.g., the time it takes to erase the designated block). If a read request is presented to the NAND device, it must be delayed or queued until the NAND device completes its erase operation, thus resulting in a potentially significant latency delay for access to the device.

Although such erase operations occur infrequently and are not persistently encountered when utilizing such a NAND based device, they do nevertheless occur and while underway, they are likely to create the above contention/conflict between a read request and a processing block erase, resulting in high latency periods for any I/O targeting other data to the same device being erased. Such a scenario creates a high variability in the I/O latency to SSDs.

So as to compensate for such problems, disclosed herein are mechanisms to manage NAND based FLASH in an SSD device such that a duplicate block exists for all data blocks (e.g., such as a mirrored block), and then managing the NAND device in such a way that one copy of any data block can be accessed at any time, even when a first copy of the requested block is not accessible due to an erase block operation on a particular NAND device. Through practice of the disclosed architecture, methodologies, and disclosed embodiments, variability of I/O to a NAND based SSD (or other storage device having similar limitations) is greatly reduced, producing a more consistent and predictable device for latency sensitive applications.

FIG. 3A depicts a simplified block diagram of a NAND based SSD having an array of NAND devices 305 attached to a controller 315. The controller 315 is connected with a host 119 an I/O interfacing technology such as SATA, SAS, PCIe, etc. Alternatively, the controller for the NAND devices may connect to a controller 105 which in turn connects with a host 119.

Figure 3B:
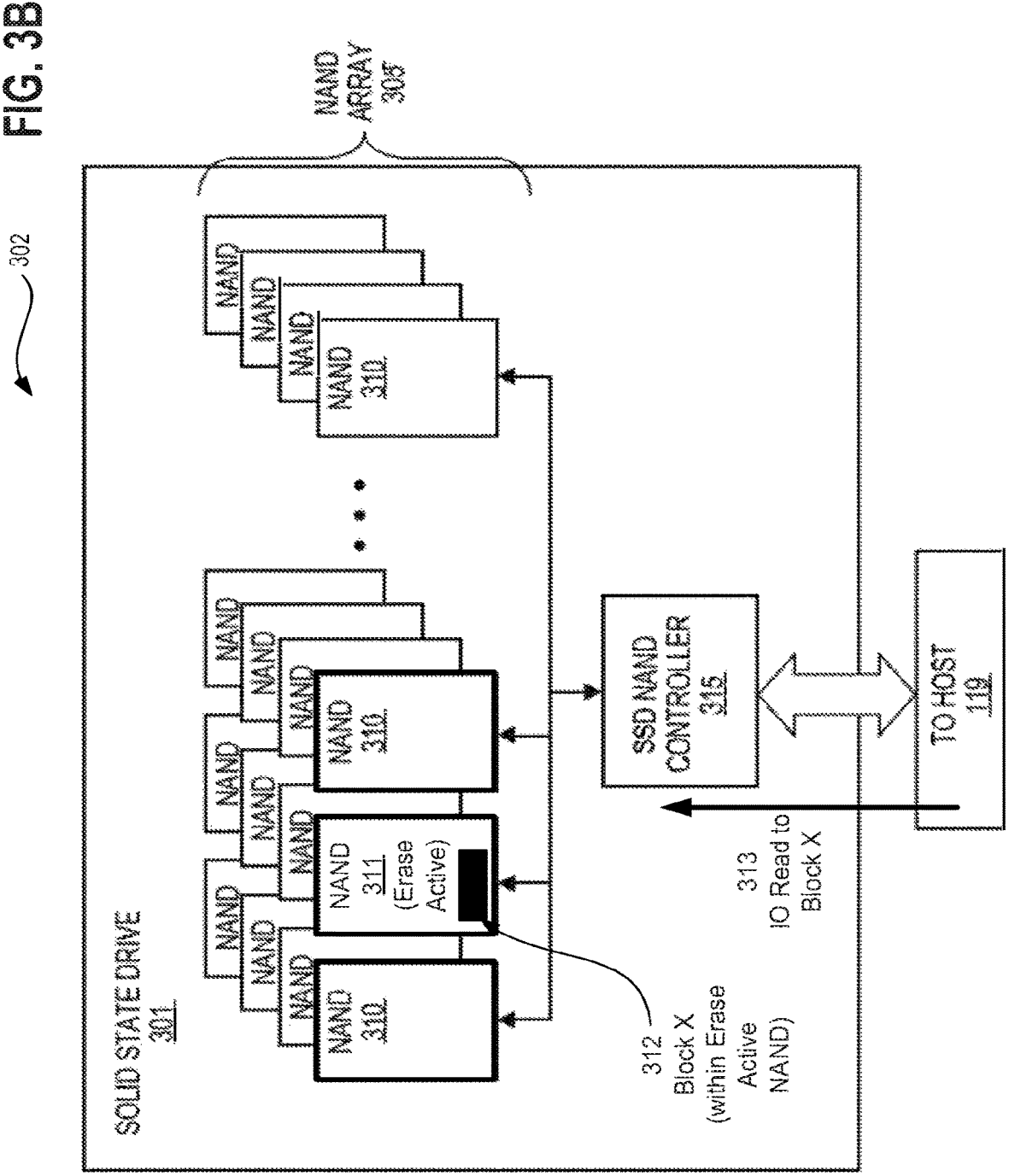
FIG. 3B depicts an alternative exemplary architectural overview of an architecture for implementing data mirroring to ensure consistent SSD (Solid-State Drive) latency in accordance with disclosed embodiments.

FIG. 3B depicts an alternative exemplary architectural overview 302 of an architecture for implementing data mirroring to ensure consistent SSD (Solid-State Drive) 301 latency in accordance with disclosed embodiments. In particular, FIG. 3B depicts a single NAND 310 based SSD storage device having a read request 312 blocked due to an active erase operation 311 presently underway in the same NAND based SSD storage device, thus resulting in an I/O request 313 for a block on that device to be delayed, thus resulting in highly variable and inconsistent latency for device access.

FIG. 3C depicts another alternative exemplary architectural overview 303 of an architecture for implementing data mirroring to ensure consistent SSD (Solid-State Drive) latency in accordance with disclosed embodiments. More particularly, a copy or mirror of each stored data block is distributed across the array of NAND devices in the SSD device, resulting in a mirrored redundancy for any stored data block, such that where an erase operation causes an I/O request to be blocked, the disclosed architecture and methodologies enable the mirrored data block or the copy of the data block to be accessed instead, without having to wait for the completion of the block erase period.

For example, NAND-m 398 and NAND-m' 399 (NAND-m prime) are depicted, each having stored a mirror or a copy of the same data block. The mirrored data block 312 is stored in both devices such that one copy may be accessible at any time, regardless of whether a pending erase operation is underway which would otherwise cause an I/O request 313 to be delayed. The disclosed mechanism further provides management for erase activity of the various NAND devices such that two NAND devices (NAND-m and NAND-m') having stored the two copies of the same data block are never erased at the same time, e.g., via block mirroring logic of the SSD 301. Managing the initiation an completion of erase periods allows for the NAND controller of the SSD device to ensure that any block of data can always be accessed with consistent latency, resulting in far greater predictability and drastically lessened variability for access requests to the SSD device due to practice of the disclosed methodologies and architecture for managing the NAND device arrays.

In the depiction set forth at FIG. 3C, the NAND-m 398 is shown as being unavailable due to the depicted erase operation of one copy of the mirrored data block. Notwithstanding the present erase operation to the NAND-m 398 device, NAND-m' 399 (NAND-m prime) remains available, and thus, the mirrored data block remains available for an I/O access request from the mirror, NAND-m' 399. Thus, through practice of the disclosed mechanism, the I/O request to data block "X" (e.g., agnostic to which one of the two copies or mirrors of the mirrored data block) can be completed with normal low NAND latency and also predictable and consistent NAND device access latency.

An exemplary algorithm for the disclosed mechanism is as follows:

1. Block "M" requires erasing;
2. Erase block "M" on primary NAND-m device 398;
3. During erase operation, service all new I/O reads from mirror device at NAND-m' (NAND-m prime) 399;
4. When erase operation completes, perform erase on NAND-m' device 399 (NAND-m prime); and
5. During erase operation of NAND-m' (NAND-m prime) 399, service all new I/O reads from primary device at NAND-m 398.

Although present NAND based SSD devices implement complex algorithms to minimize the likelihood of an erase operation conflict causing latency inconsistency and increased variably, none are capable of fully eliminating an erase operation conflict. Mirroring or copying all data blocks in the manner taught herein is non-intuitive due the cost of NAND based SSD devices at a cost per gigabyte ratio in comparison to the vastly higher capacity and less costly per gigabyte HDDs. Such a solution is non-intuitive because the proposed solution consumes space as a trade-off for the guarantee of consistent latency. Nevertheless, there are applications where consistently predictable and low latency of the NAND based SSD device is paramount over capacity of a NAND based SSD device, and thus, the disclosed methodologies address the needs of such target applications that are highly sensitive to I/O access request latency periods. Placing the priority upon minimizing latency variability through the use of data block mirroring or storing data block copies differentiates the presently disclosed embodiments from the more complex algorithms which minimize, but do not guarantee elimination of such erase operation conflicts.

Figure 4A:
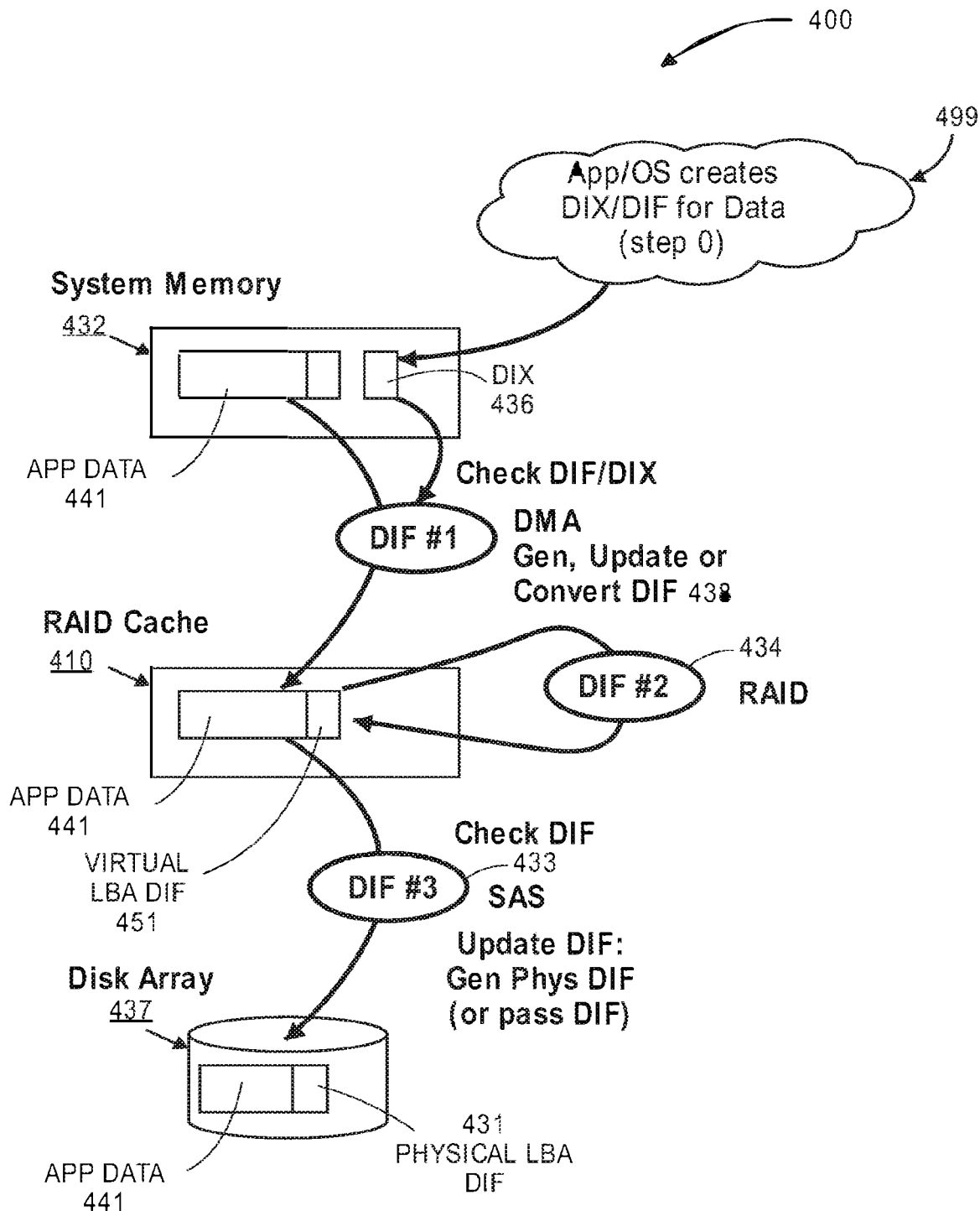
FIG. 4A depicts an exemplary architectural overview of an architecture for implementing improved RAID 5/6 performance in accordance with disclosed embodiments.

FIG. 4A depicts an exemplary architectural overview 400 of an architecture for implementing improved RAID 5/6 performance in accordance with disclosed embodiments. The underlying devices depicted may operate as direct accessed storage devices 117 in accordance with disclosed embodiments or may alternatively operate as underlying endpoint storage devices operating under the control and management of the host 119 or the host OS 120, or a host RAID controller operating on behalf of the host 119, or within, for example, a controller 105 which implements the disclosed architecture, mechanisms, and methodologies to implement the improved RAID 5/6 performance as disclosed.

In accordance with disclosed embodiments, solutions and methods for boosting a controller's performance and RAS with DIF Support via concurrent RAID processing provides a mechanism to offer the highest performance through specialized chipset hardware in a controller capable to perform calculation of parity fields across a number of sources, and in particular, XOR (eXclusive OR) and GF (Galois Field) multiply operations in the nomenclature of RAID 5/6.

The concept of Redundant Array of Independent Disks (RAID) has been used in Storage technologies to increase the availability of data storage systems such as in databases, file storage and other critical areas. Hardware based RAID offers the highest performance through specialized chipset hardware implemented commonly into a dedicated controller for the calculation of parity fields across a number of sources. In RAID 5/6 nomenclature, such hardware based functionality includes XOR and GF multiply operations. Data integrity is an important feature for Storage systems in the enterprise and business segments. The Data integrity Field, or DIF, provides a system solution to protect communication between a host adapter and a storage device for a true end-to-end data integrity. Isolation and/or correction of bad data occurs as early as possible with minimal impact to system integrity and performance. Utilization of T10 type DIF allows for an expansion of the protection domains and DIF operations to include DIF insert, DIF verify, and DIF delete operations.

When data is transferred with RAID, the potential for data corruption is large if the system does not have suitable error detection schemes. At least two areas of design considerations for RAID systems warrant consideration to increase their suitability and appropriateness for implementation into medium an high end storage implementations. In particular, 1) High throughput; and 2) High RAS (Reliability, Availability and Serviceability) capability.

Silent data corruption which occurs in a fault tolerant RAID configuration negates the value of having a RAID implementation, as the RAID then stores corrupt data which is unusable. To obviate such a deficiency and improve overall RAS for the RAID system, the concept of DIF & RAID with DIF capabilities is disclosed herein as a mechanism to provide and utilize end to end CRC (Cyclic Redundancy Check) capabilities. The DIF (Data Integrity Field) and DIX (Data Integrity eXtension) 436 are mechanisms used to guard data through T10 type CRC and/or Checksum capabilities.

However, the implementation of RAID with DIF as disclosed herein in accordance with the various embodiments requires more complex logic in conjunction with the RAID processing engine to perform operations on DIF checks and update 438 operations in tandem.

Previously known RAID based algorithms implement a serial process to transfer data from the host to a local cache, perform parity calculations on the local data, and then write data and parity results to the disk.

Disclosed herein is a concurrent flow architecture through a specialized hardware chipset which is enabled to implement a the concurrent flow for implementing an improved RAID algorithms as will be described in additional detail below. For example, a DMA (Direct Memory Access) chipset or a CBDMA (Crystal Beach DMA) chipset available from Intel Corporation, legal assignee of the present application, may be utilized to implement the disclosed concurrent flow architecture and methodologies for an improved RAID storage solution as disclosed herein which optimizes the data transfer function and parity computational functions potentially resulting in higher overall application bandwidth, lower power, improved RAS, and reduced memory utilization.

The disclosed concurrent flow architecture and methodologies for an improved RAID storage solution provides additional advantages, such as reducing software overhead and further enables niche operations such as dual casting for storage IOP (Integrated I/O Processor) applications, thus resulting in savings of silicon area.

The demand for increases in capacity, speed, and availability of storage systems has provided impetus for the emergence of Redundant Array of Inexpensive Disks (RAID) industry wide. RAID-5 and RAID-6 (e.g., Raid 5/6) methods provide data protection for single mode failures and double mode failures respectively, sometimes referred to as single syndrome and double syndrome failure modes, single drive and double drive failure modes, and so forth. Raid 5 enables total recovery from a catastrophic loss on a single drive through the implementation of a single P parity data whereas RAID 6 enables total recovery from a catastrophic loss on two separate concurrent drive failures through the implementation of the P parity data and through the additional implementation of what is commonly referred to as Q parity data. The concepts of RAID 5/6 are not new, rather, disclosed herein is a concurrent flow architecture and methodologies for an improved RAID storage solution to optimize RAID 5/6 over what is previously known.

RAID cache 410 represents recent write data that yet to be written to the underlying disks which constitute a target RAID set at disk array 437. Previously known RAID 5/6 implementations suffer from a streaming write performance that limited by system memory 432 and thus serves as a bottleneck. Disclosed herein as part of the concurrent flow architecture and methodologies is the utilization of DMA capabilities to move the data from an application system memory region to a local system memory region for RAID 5/6 and data integrity checking. Such an optimization eliminates a read/write operation to enhance system performance Previously known mechanisms therefore require an additional read/write operation in contrast to improved concurrent flow architecture and methodologies described herein, and thus, are not as efficient.

Through the use of the concurrent flow architecture and methodologies for an improved RAID as disclosed herein, and additionally through the utilization of DMA based capabilities, data acceleration and increased RAS coverage may be realized, thus improving overall write throughput to an underlying RAID implementation which operates in accordance with one or more of the disclosed embodiments. Moreover, the disclosed architecture and methodologies result in an offloading of computational overhead from a host 119 system's CPU (Central Processing Unit), thus providing specialized chipset hardware functionality such as RAID 5/6 processing, data integrity computation, and multicasting, via the implementing hardware.

Previously known RAID 5/6 streaming write operations performed through an I/O Storage controller involve the transfer of source data (for writes) from a host 119 to a local memory of the host. Conversely, the concurrent flow architecture and methodologies disclosed herein utilizes a DMA engine in a storage controller to read the transferred data from local memory to calculate parity and write it back to local memory. Even where a DMA based architecture is utilized, the DMA engine of the I/O storage controller reads the transferred data from local memory to calculate parity and then writes the parity data back to local memory as depicted by DIF #2 operation at 434 pulling and writing data back to the RAID cache 410, after which point the DMA engine would then perform a read operation of the transferred data and the computed parity data written previously and then write all the data to the storage devices constituting the target RAID set at disk array 437. As can be seen, such previously known techniques involve multiple reads/writes across the memory interface resulting in high demand on the resource and causing contention with other applications and system operations competing for the same limited resource.

The concurrent flow architecture and methodologies disclosed herein provide a significant improvement in the memory bandwidth for streaming data sets utilizing DIF through the capability to combine the source data transfer and parity calculation into a single operation, thus eliminating a read/write operation compared to previously known techniques as described above. The concurrent flow architecture and methodologies therefore enable calculated parity and transferred data to be written to their final destination with fewer I/O resource demands (e.g., written to the target destination drives constituting the RAID set, such as HDDs, SCSI Drives (Small Computer System Interface Drives) or Flash or SSD based drives, such as those which, for example, may be implemented as Direct Accessed Storage 117 or implemented as endpoint drives which are under the control of the host 119, the host OS 120, or a controller operating on behalf of the host, such as a storage controller or a controller 105 having which implements the concurrent flow architecture and methodologies as disclosed herein).

In the disclosed embodiments utilizing the concurrent flow architecture and methodologies for an improved RAID storage solution, a DMA copy operation gets write data from the application buffer of the host 119 to the RAID cache (local memory) of the I/O processor with parity calculated concurrently thus enabling the I/O operation to completed to the host 119 without the delay of writing to the disk and at the same time, minimizing the memory overhead which would otherwise be associated with additional read/write operations, thus improving application data throughput.

FIG. 4A further illustrates RAID with DIF (DIX) 436 for a ROL (RAID On Load) implementation or a ROC (RAID On Chip) implementation depicting the concurrent flow architecture and methodologies from an easy to understand high level perspective. For instance, with ROL and ROC, an application driver for the host OS 120 stores data in DIX format in system memory 432 of the host 119. However, in some cases, DIF format can also be created 499 on the host 119 (e.g., marked "step 0"). The system memory 432 thus having stored therein App Data 441 and DIX 436 in such an embodiment. When DIF data created at the host 119 is copied over to the RAID cache 410, in which the DIF data now copied is marked DIF #2 at element 434). The RAID cache 410 having stored therein App Data 441 and Virtual LBA DIF 451. The DMA architecture will check or verify the DIF information or the DIX 436 (e.g., denoted by the term DIF #1) and perform an update or convert operation 438. Further depicted at DIF #2 is the RAID with DIF operation that creates P and Q parity in the case of a dual syndrome data protection scheme. Finally, the SAS controller (Serial Attached SCSI bus controller) performs the DMA operation denoted by DIF #3 at element 433 to check and move the generated DIF data sources and P/Q parity data to the target disks or disk array 437 of the RAID set. The disk array 437 thus having stored therein App Data 441 and Physical LBA DIF 431. The disclosed concurrent flow architecture and methodologies can combine the operations for DIF #1 to check and update along with RAID Parity generate operations DIF #2 434 on the fly.

For the general I/O write case where the write data is smaller than the RAID stripe, a Read Modify Write (RMW) operation to the disk is required. However, in embodiments for large streaming writes, where multiple sequential writes are issued, a full stripe of data can be collected such that a RMW to the disk is not required. In such an embodiment, new parity is calculated from new data which is copied from the host. A RAID stack therefore does not need to wait to accumulate I/O write requests sufficient to create a full stripe. In this embodiment, descriptors are formed for XOR calculations where the source data would be ordinarily be copied from I/O (host) to memory and the XOR result would ordinarily be calculated and stored in system memory 432.

An example of a large I/O write operation such as those which happen during disk copy is a 25 GB HD-DVD copy to disk, where the single I/O is at least as large or greater than the stripe length. In such an example, the RAID stack need not accumulate multiple I/O requests in order to issue the DMA/XOR operation and copy the data to cache while performing XOR. The concurrent flow architecture and methodologies enable such a new capability for the XOR/PQ operation where it combines both data copy and RAID.

Complementary RAID software manages the logical to physical translation of the I/O request up front in preparation for the combined DMA/XOR operations. Such an improved feature can be implemented directly into a RAID software stack or appropriate extensions, where the tasks associated with I/O caching would thus be directed to combine with the XOR processing.

Higher throughput is attained from the elimination of one read from memory for RAID calculation, reducing the memory bandwidth demands Such an improvement is translatable directly to a quantifiable benchmark performance improvement for streaming write, and large write workloads which are known to be memory limited when utilizing previously known techniques.

Higher RAS coverage is attained performing RAID-5/6 and data integrity checks 438 concurrently in DMA supporting architecture by offloading computational demands from a host's 119 CPU and thus improves IPC (Instruction(s) per clock), eliminates SSE L1 thrash, and improves cache miss-improves, all resulting in enhanced RAS coverage.

For random server workloads of varying sizes, the stripe size, (e.g., 8 KB of the RAID-5/6 array) must be equal to or less than the expected I/O size to see such benchmarking improvements. Systems may thus be accordingly tuned to eliminate the RMW for parity, and to maximize storage performance for particular server workloads so as to elicit the above performance benefits.

Table 1 captures the various innovations provided via the disclosed concurrent flow architecture and methodologies for an improved RAID storage solution including, normal data, and DIF encoded data and DIX encoded data with auto-conversion to DIF in accordance with some embodiments. The stared (*) options denoted at 1*b*, 1*c*, 2*c*, 3*a* in the table represent new innovations provided by disclosed concurrent flow architecture and methodologies which are not attainable using previously known mechanisms for RAID 5/6 processing.

TABLE 1

RAID optimized functions with DIF/DIX

| Source DIF | RAID PQ Generate |
|---|---|
| None | 1b. Optimized RAID operation data copy* |
|  | 1c. Optimized RAID operation data copy with DIF insert* |
| DIF | 2a. RAID Generation with DIF |
|  | 2b. Reconstruction with DIF (result check Strip/DIF/DIX) |
|  | 2c. Optimized RAID operation data copy with DIF check (update)* |
| DIX | 3a. Optimized RAID operation* Data copy with DIX convert |

*New Functions as disclosed herein.

The disclosed methodologies may alternatively be integrated into a DMA engine of a processor for use with software-based RAID stacks running, for example, on the host's 119 Processor.

Consider the following performance analysis examples utilizing the disclosed concurrent flow architecture and methodologies. First, assume for example a 3+1 configuration having three (3x) source disks plus one (1x) disk for parity in a simple RAID-5 write configuration. For three sources, let 3x be the total incoming data BW from host to CBDMA where "x" is the per source BW on a PCIe link to the host 119.

An un-optimized RAID thus results in DMA reads at 3x from host and writes at 3x to the local memory; DMA Reads in at 3x from local memory and writes 1x(P) to the local memory; the disk controller reads 4x from local memory to write to storage media. Thus, total memory BW (R & W) is 3x+3x+1x+4x=11x total.

Consider now in contrast, an optimized RAID flow in accordance with the disclosed embodiments in which a DMA reads at 3x from host and writes at 3x (data)+1x (P) to the local memory; the disk controller reads 4x from local memory to writes to storage media. Thus, the total memory BW as optimized (R & W) is 3x+1x+4x=8x total, the reduction owing the eliminated read/write cycle discussed previously and demonstrated in the un-optimized example.

Thus, an application bandwidth gain of 11x/8x=1.375 results, or an improvement of greater than 37% in comparison to the un-optimized techniques. Further still, local memory bandwidth reduction is 3x/11x=0.272 or approximately ~27% less overhead compared to the un-optimized techniques.

Power savings are further attainable through the practice of the disclosed embodiments using the concurrent flow architecture and methodologies. For instance, a DDR3 Physical layer (I/O) power dissipation for an exemplary memory controller is approximately ~1.5 W @ 70% (max) utilization for the un-optimized RAID configuration. A 27% drop in utilization with the optimized case calculates out to be 1.1 W or a 400 mW reduction. Such a reduction is significant and may serve to bring an otherwise non-compliant TDP (Thermal Design Power) envelope within bounds. Further still, core logic power reduction is attained from less activity in the chipset.

Enabling the DIF/DIX checking and conversion during the RAID 5/6 parity computation on the fly provides such improvements over a lacking architecture incapable of performing DIF checking thus resulting in such a DIF check having to be performed by the host's 119 processor, resulting in computational overhead and by extension, an effective lowering of RAID streaming bandwidth throughput for hosted application.

The optimized (combined) operation of the data transfer and parity calculation in one ensemble reduces memory bandwidth, cuts down dynamic power (as fewer circuits are energized), requires fewer descriptors, and improves overall memory utilization and RAID-5/6 performance while boosting the RAS capabilities of the system with built-in DIF checks on streaming data.

Figure 4B:
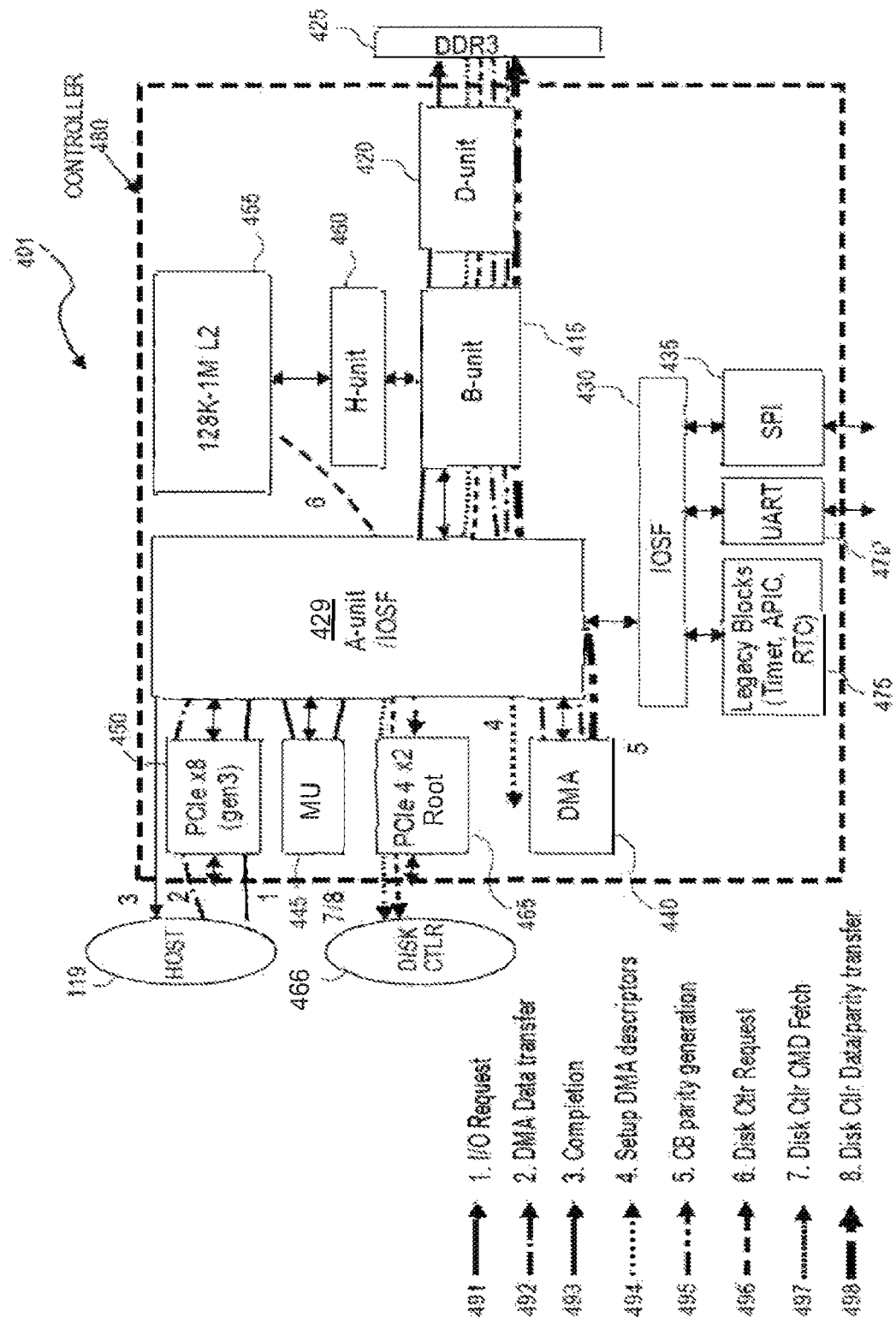

FIG. 4B and FIG. 4C depict the contrast between an un-optimized RAID 5/6 operation 401 at FIG. 4B versus an optimized RAID 5/6 operation 402 at FIG. 4C respectively, the optimized RAID 5/6 operation 402 utilizing concurrent flow architecture and methodologies in accordance with disclosed embodiments.

For each of FIGS. 4B and 4C, a controller 480 (such as an IOP controller) with flash storage is depicted. The IOP controller 480 having a number of components including L2 cache 455 (e.g., 128K to 1M is depicted) an H-unit 460 (for Front side Bus) interface to a CPU, a B-unit interface to a DDR3 Memory 425, a DMA 440 engine (or a CBDMA engine), a messaging unit 445, an A-Unit/IOSF fabric 429 (On-chip Scalable System Fabric) and IOSF 430, PCIe Gen3 x8/x4 ports 450 for interconnecting the host 119, a disk storage controller 466 (e.g., a NAND disk controller, etc.), SPI 435, UART 470, Legacy Blocks 475 (e.g., Timer, APIC, RTC), PCIe 4 x2 Root 465, D-Unit 420, and B-Unit 415.

The optimized RAID 5/6 operation 402 cuts down the number of read/write steps required for the overall transaction resulting in higher write throughput and reduced local memory utilization in contrast to the un-optimized RAID 5/6 operation 401. Further still, the DMA engine can insert DIF, or check DIF for encoded data and optionally convert DIX to DIF 438 while performing RAID parity calculations in accordance with the disclosed embodiments and the optimized RAID 5/6 operation 402.

Un-optimized RAID 5/6 operation 401 at FIG. 4B depicts the following operations: 1) I/O Request 491 in which host 119 builds an I/O request in host memory and posts the I/O request in the implementing controller's messaging unit (e.g., a controller 105 messaging unit 445 or the message unit of another implementing controller), the messaging unit 445 transfers command from the host memory to local memory of implementing controller's local memory and interrupts the core, responsive to which the core builds and posts descriptor in local memory of the controller and then sends the request to the DMA unit 440. 2) DMA Data Transfer 492: The DMA unit 440 moves data from host memory to the messaging unit 445 and interrupts the core. 3) Completion 493: The core posts completion in host memory and interrupts the host 119. 4) Setup DMA descriptors 494: The core builds and posts parity related descriptors in local memory to the implementing controller and posts a request to the DMA unit. 5) DMA parity generation 495: DMA generates parity in local memory to the implementing controller and interrupts the core. 6) Disk controller Request 496: The core builds and posts commands (e.g., NAND commands) in the messaging unit 445 and posts link command to the disk controller. 7) Disk controller command fetch operation 497. 8) Disk controller data/parity transfer operation 498: The disk controller moves data and parity from local memory of the implementing controller to the underlying RAID storage disk set, and then posts completion into local memory of the implementing controller, and interrupts the core.

Optimized RAID 5/6 operation 402 at FIG. 4C depicts the following operations: 1) I/O Request 481 in which host 119 builds an I/O request in host memory and posts the I/O request in the implementing controller's messaging unit (e.g., a controller's 105 Messaging Unit (MU) or the message unit of another implementing controller), the messaging unit transfers command from the host memory to local memory of implementing controller's local memory and interrupts the core, responsive to which the core builds and posts descriptor in local memory of the controller and then sends the request to the DMA unit. 2) DMA Optimized Data transfer with parity 482: The DMA unit moves data from host memory to local memory of the implementing controller and calculates parity concurrently, then interrupts the core. 3) Completion 483: The core posts completion in host memory and interrupts the host 119 thus negating the need for items "4" and "5" from operation 401 at FIG. 4B. depicting the un-optimized RAID 5/6 methodology. 4) Disk controller Request 484: The core builds and posts commands in the messaging unit 445 and posts link command to the disk controller. 5) Disk controller command fetch 485 operation. 6) Disk controller data/parity transfer operation 486. For example, an ANC moves data and parity from the messaging unit to the underlying RAID storage disk set, and then posts completion into the messaging unit, and interrupts the core (ANC stands for "Application optimized Non-volatile memory," such as an ANC based FLASH memory device and Controller, including those for NAND memory arrays).

Figure 4D:
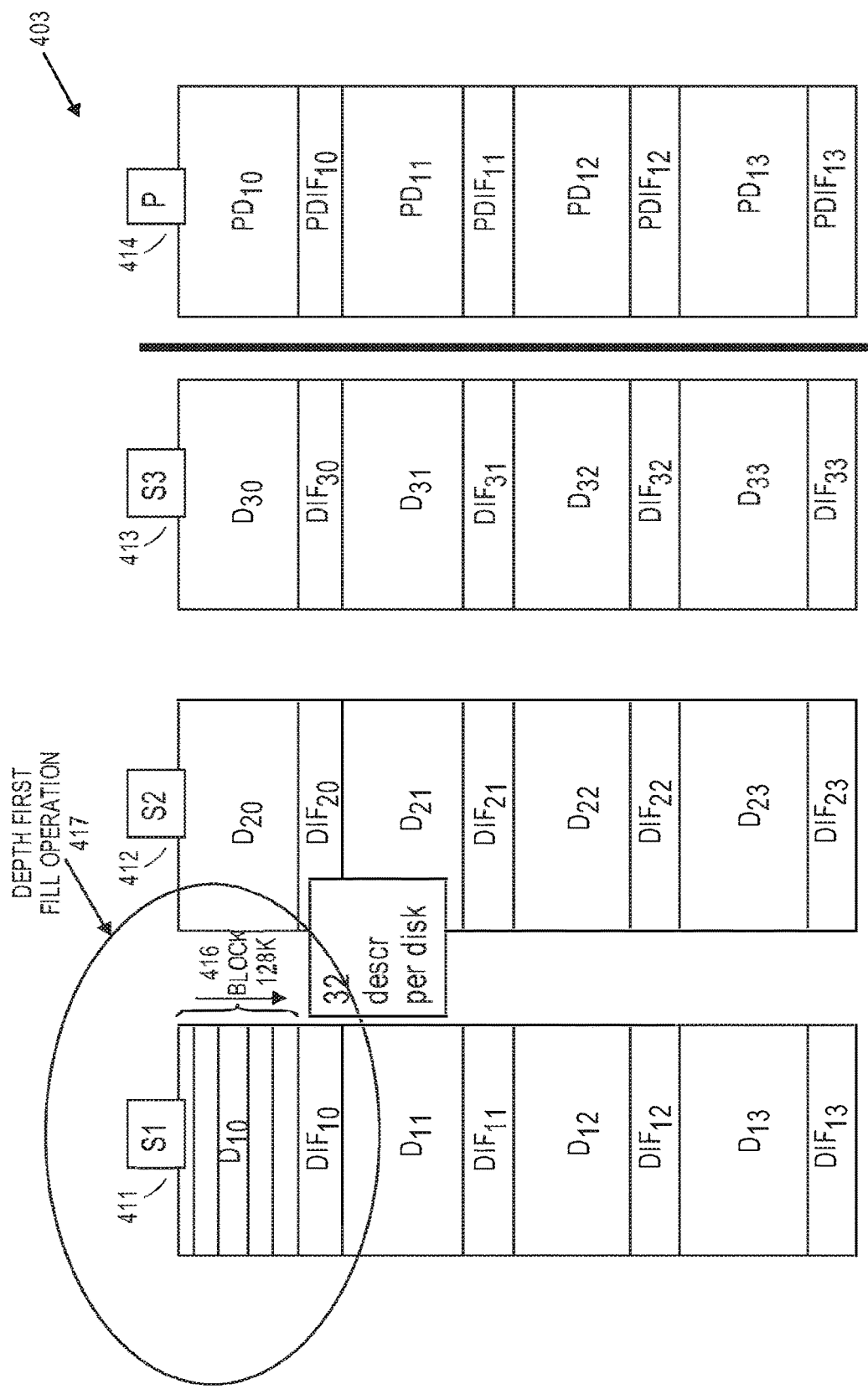
FIG. 4D and FIG. 4E depict the contrast between a depth first fill algorithm and an optimized breadth first style fill operation in accordance with disclosed embodiments.
Figure 4E:
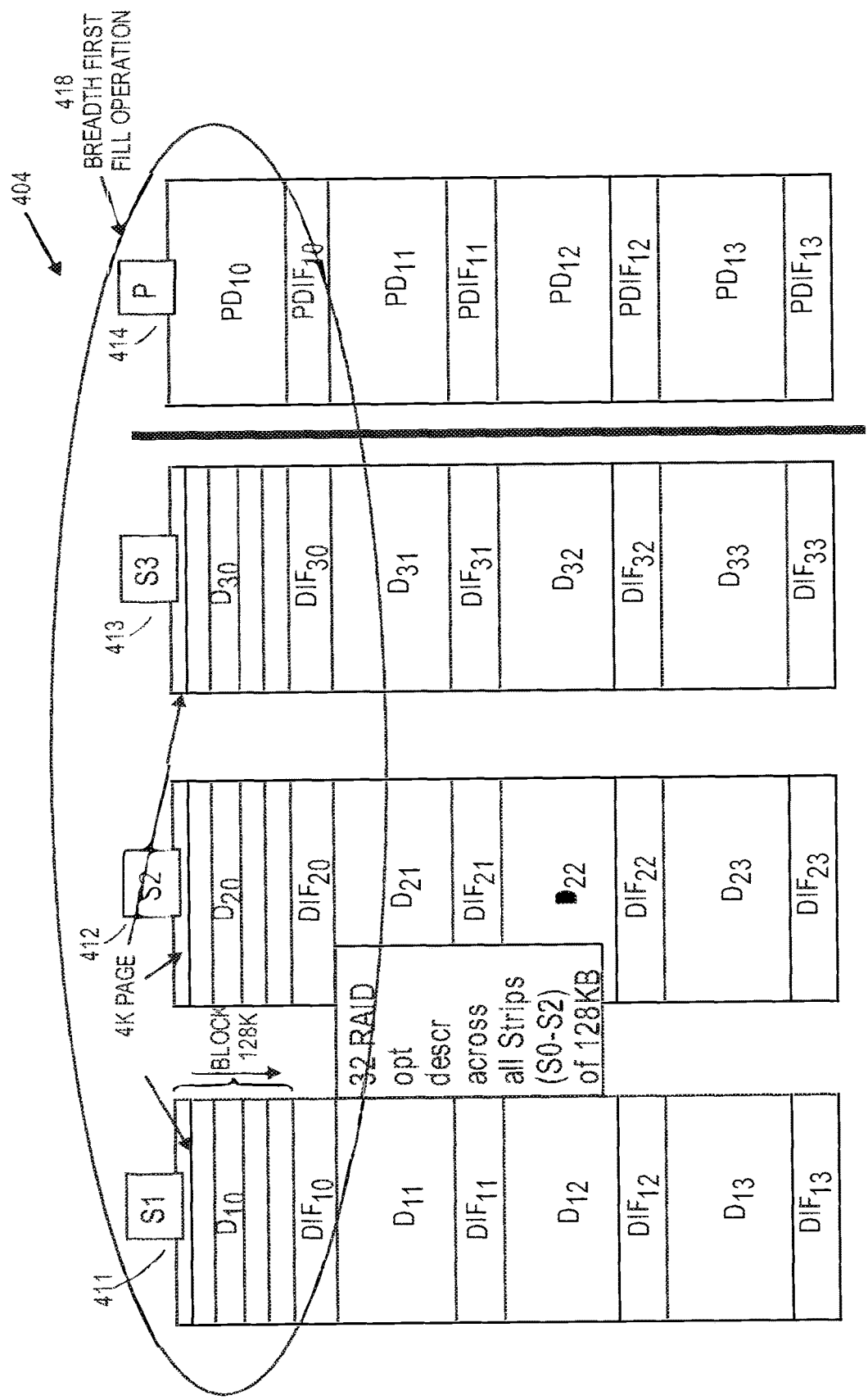

FIG. 4D and FIG. 4E depict the contrast between a depth first fill algorithm 403 and an optimized breadth first style fill operation 404 in accordance with disclosed embodiments.

When the DMA hardware is used for RAID processing, a software based RAID stack may employ a depth first fill 417 algorithm 403 filling each page up to the maximum strip size before switching over to the next disk sequentially, for example, filling S1 at element 411, then filling the next disk sequentially which is S2 at element 412, then S3 at element 413. Parity disk P for this example is depicted at element 414. Such a methodology creates large overhead due to the number of descriptors required. For example, 96 descriptors are required for the first strip across 3 disks as depicted at FIG. 4D in which there are 32 descriptors per disk filling a 128K block 416 at each of the disks (shown here with regard to S1 at element 411 specifically).

Conversely, the optimized breadth first style fill 418 filling operation 404 depicted at FIG. 4E utilizes a RAID optimized descriptor, through which, total descriptors required is reduced to a total of 32 descriptors, as shown. Here, the fill operation 404 fills "breadth first" 418 across all of S1 at element 411, S2 at element 412, S3 at element 413, and Parity disk for P at element 414 as part of the breadth first fill 418 filling operation 404. The resultant 3:1 reduction improves a software based RAID stack's operational efficiency, making it more efficient as depicted at FIG. 4E utilizes the RAID optimized descriptor, thus leading to improved bandwidth.

Figure 4F:
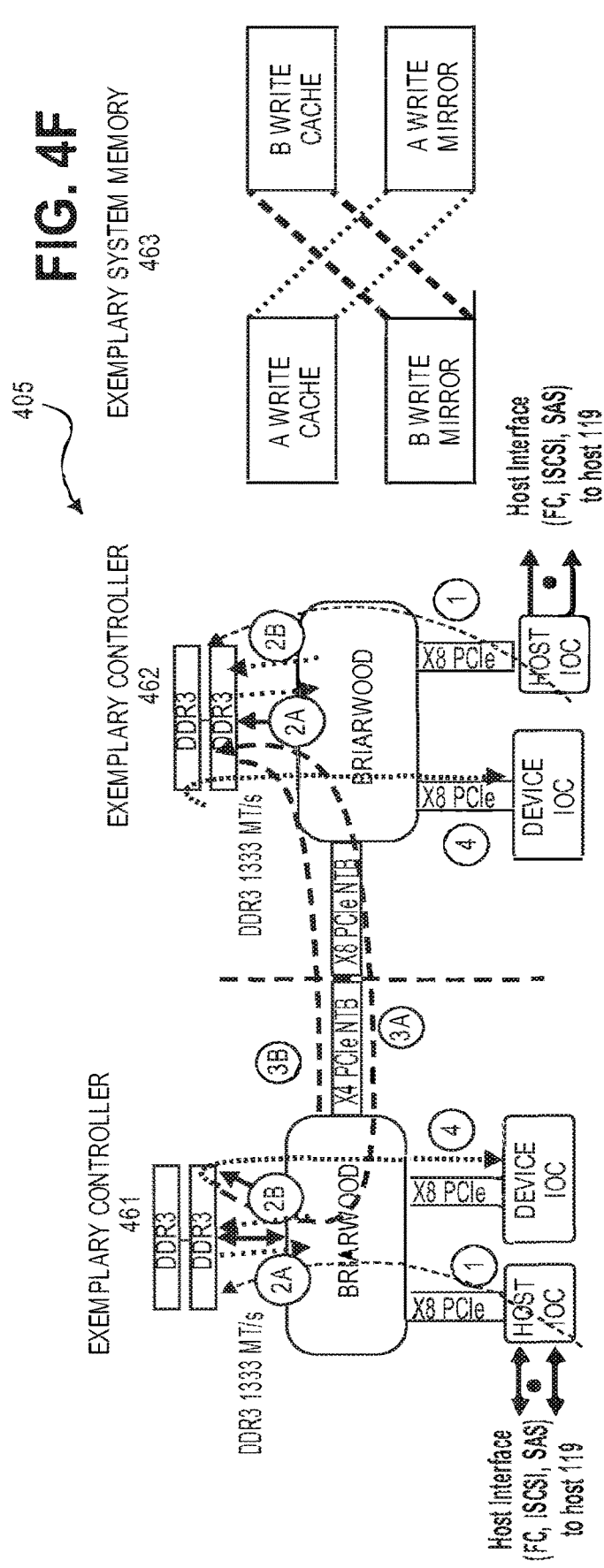

FIG. 4F and FIG. 4G depicts a dual canister data flow 405 for improved RAID 5/6 performance and resulting performance analysis 406 on an exemplary RAID 5/6 10+2 configuration in accordance with disclosed embodiments.

The dual canister data flow 405 (e.g., as implemented into, for example, a Briarwood controller, or other capable controller) as illustrated involves dual casting. Two exemplary controllers are depicted for this particular dual canister data flow 405 operation acting upon exemplary controller 461 and exemplary controller 462 respectively. An exemplary system memory 463 is further depicted showing the distinctive paths between A write cache and A write mirror and B write Mirror and B write cache respectively. With an optimized RAID DMA engine, operations 2a, 2b and 3 are combined into a single descriptor upon which transfer parity results to the local memory while saving data through the NTB (Non-Transparent Bridging) to the other partner node without having to re-read data from memory. This obviates the need for special multi-casting logic. The data path mapping table 464 set forth below provides notes regarding the various depicted paths for the dual canister data flow 405 including each of the shown data paths "1" "2A" "2B" "3A" "3B" and data path "4" as represented between the two exemplary controllers 461 and 462.

Performance analysis table 406 depicts a shown 20% improvement in the effective bandwidth for the Briarwood RAID 5/6 for a 10+2 disk storage system depicted. Performance analysis table 406 depicts several values shown via the practice of the disclosed embodiments including Max DRAM BW 469, Efficiency 471, Application usage 472, Useable DRAM BW 473, RAID-6 BW (RTF) 474, RAID-6 BW (Memory [single canister]) 476, RAID-6 BW (Memory [dual canister]) 477, RAID-5 BW (Memory [single canister]) 478, and RAID-5 BW (Memory [dual canister]) 479. Similar results are thus expected for other similarly capable controllers practicing the disclosed embodiments set forth herein. Software stack RAID operations are improved, a reduction in system memory usage is attained, overall RAID performance (I/O Operations per second) while simplifying a RAID stack software is attained by allowing use of bin-1 memory speed to get same performance as a non-optimized data flow. The methodology can be applied to SAS, SSD or any other storage technologies as long as the application is able to exploit it by providing data transfer size in excess of the stripe length of the RAID array.

Dual casting using RAID optimization helps to avoid other hardware methods such as PCIe or switch multicasting methods that are more complex and area intensive. Furthermore, high end RAS capability through DIF encoding checks executed concurrently on streaming data is enabled thus precluding extra cycles from a host's 119 CPU by not requiring additional memory reads.

Figure 5A:
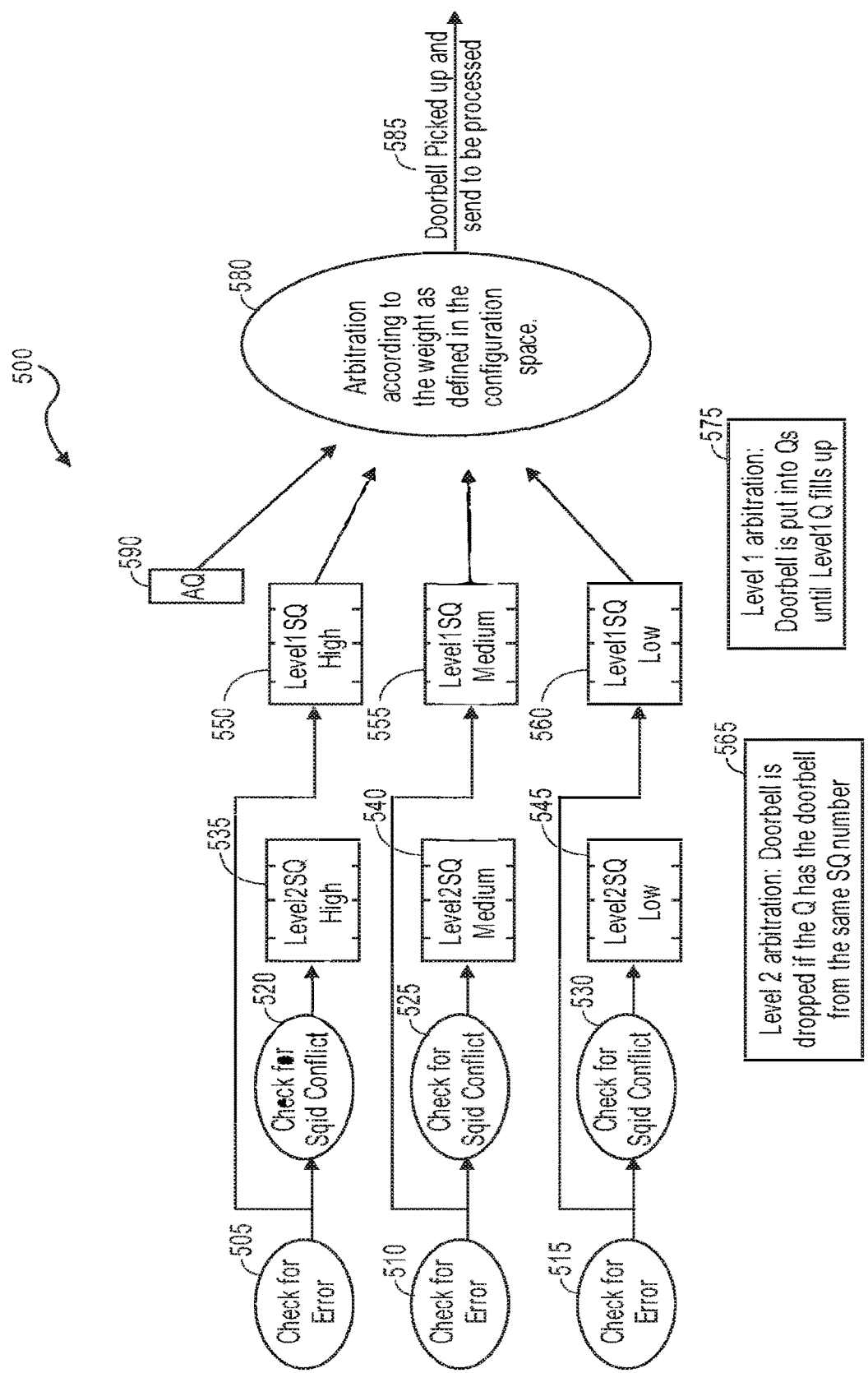
FIG. 5A depicts an exemplary architectural overview for a host to handle host doorbell writes with a limited number of doorbells without throttling host doorbell writes or overflowing doorbell space in the I/O device in accordance with disclosed embodiments.

FIG. 5A depicts an exemplary architectural overview 500 for a host 119 to handle host doorbell writes with a limited number of doorbells without throttling host doorbell writes or overflowing doorbell space in the I/O device in accordance with disclosed embodiments.

In accordance with disclosed embodiments, arbitration and resource schemes of a doorbell mechanism, including doorbell arbitration for fairness and prevention of attack congestion provides a mechanism to handle host doorbell writes with a limited number of doorbells without throttling host doorbell writes or overflowing doorbell space in the I/O device. For example, in a host 119 which creates work queues in host memory and informs the I/O device to process them by writing to the doorbells implemented in the I/O device. Anytime the host 119 adds an entry to the host work queue, the host writes the tail pointer to the I/O doorbell space. Since the amount of doorbell space is limited in the I/O device, the disclosed mechanism as taught herein enables handling of the host doorbell writes with a limited number of doorbells without throttling host doorbell writes or overflowing doorbell space in the I/O device in accordance with disclosed embodiments. Further, the doorbell writes are processed in a fair manner through the practice of the disclosed embodiments.

Two types of jobs arrive from the host 119 to a card, such as controller 105. One type is an admin job arriving as Admin doorbell message into the Admin Queue (AQ) 590. The second type is a regular storage processing job arriving as Submission Queue Doorbell. Either admin jobs or regular storage processing jobs (doorbells) may be picked up and sent to be processed 585.

FIG. 5A depicts two levels of such a queue structure (Q structure), specifically Q structures Level 1 SQ_x (including Level 1 High 550, Level 1 medium 555, and Level 1 low 560), and Level 2 SQ_x (including Level 2 High 535, Level 2 medium 540, and Level 2 Low 545). In Level 1 SQ_x (560, 555, and 550), the entries contain information on how many SQ entries are in the doorbell, and in Level 1 SQ_x mode, all doorbells that arrive will be put into the Level 1 SQ_x Q structure in order (after Error Check 505, 510, and 515), and will be arbitrated according to the weight specified in the configuration space 580 (Weight_AQ) which specifies how many jobs can be processed at a maximum before switching to other SQs (Service Queues). Weight_SQ_High (parameter, configuration, or threshold value) specifies how many jobs can be processed at a maximum before switching to SQ_Medium, and so forth. Level 1 arbitration 575 provides for the doorbell to be put into Qs until the Level 1 SQ_x (560, 555, and 550) is filled up.

In Level 2 SQ_x (535, 540, and 545), a new doorbell arriving from the host 119 will not only go through Error Check 505, 510, and 515, but is also CAMed (checked against "Content-Addressable Memory" or "CAM") against the Level 2 SQ_x using the SQids (Service Queue Identifiers) 520, 525, and 530 to make sure that no previous doorbell from the same SQ is still pending, before the arriving doorbell is pushed into the Level 2 SQ_x. A new doorbell for which a matching CAM hit is found will therefore be dropped 565.

Figure 5B:
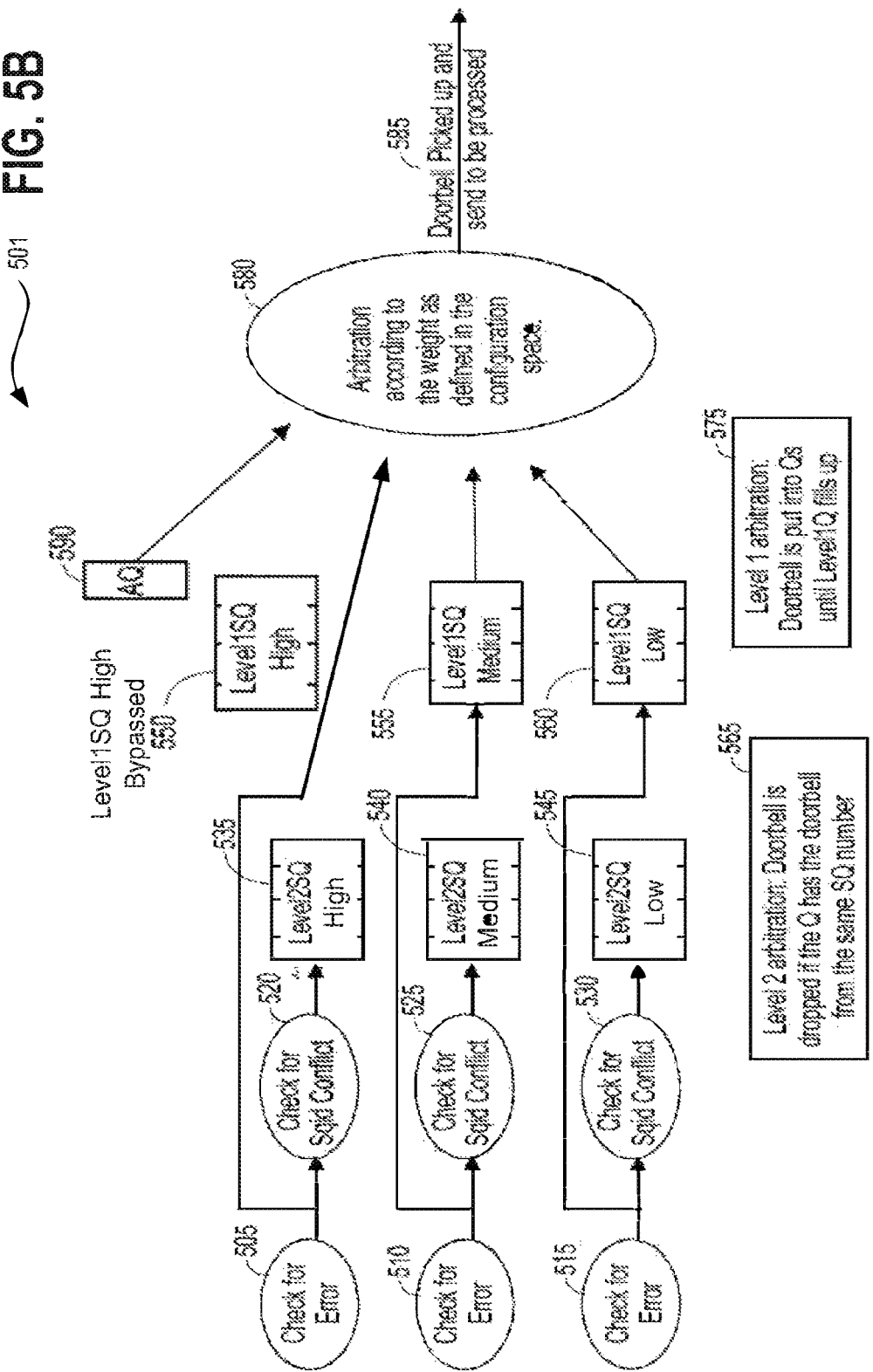
FIG. 5B depicts an alternative exemplary architectural overview for a host to handle host doorbells in accordance with disclosed embodiments.

FIG. 5B depicts an alternative exemplary architectural overview 501 for a host 119 to handle host doorbells in accordance with disclosed embodiments. In particular, Level 1 SQ High 550 may optionally be entirely bypassed in accordance with the depicted embodiment by continuous processing of Level 1 SQ High doorbells, thus negating the need for Level 1 SQ High 550 queuing (e.g., the space starts and may remain empty). The operation depicted here shows initially that all Level 1 SQ_x and Level 2 SQ_x spaces/positions are empty. A new doorbell arriving from host 119 goes through the error checking (e.g., CAM matching) which checks for repeated doorbells of same value and doorbell roll over. When errors are detected, the SQ associated with the doorbell having the error or an outright malicious doorbell will be disabled and removed from further arbitration.

After error checking, the doorbell (e.g., assuming an SQ number "n" for his example) will then be pushed into Level 1 SQ_High. This process continues until Level 1 SQ_High fills completely. Subsequent to the Level 1 SQ_High space being filled, other High priority doorbell will be put in Level 2 SQ_High space. For example, if SQ n sends ten (10x) more doorbells after Level 1 SQ_High is full, only the first doorbell is put in the Level 2 SQ_High, and the other nine doorbells are dropped. Doorbells from SQ medium are also placed into Level 2 SQ_High space at such time.

Doorbells in the Level 1 SQ_High will continuously be serviced until Level 1 SQ_High space is empty of pending doorbells (e.g., using a weighted round robin with Level 1 SQ_Medium and Level 1 SQ_Low rotational methodology). Next, pending doorbells from Level 2 SQ_High will be serviced, as is depicted by FIG. 5B.

A doorbell picked up from Level 2 SQ_High may only have up to a maximum number of jobs being service as determined by MAX_JOB_SQH value or other appropriately configured threshold in the configuration space. Left over jobs cause doorbell from SQ n in this example to be placed at the end of the Level 2 SQ_High space, waiting for the next round of doorbell servicing.

The Level 1 SQ Arbitration mechanism enables a requesting entity or platform that requires a submitted doorbell to be process strictly in the order that the host 119 sent to the I/O device. Level 2 SQ is provided for the prevention of any doorbell overflow. Preferably, behavior of the software is strictly controlled in accordance with the disclosed embodiments such that overflow will not occur or rarely occurs.

FIG. 5C depicts another alternative exemplary architectural overview 502 for a host to handle host doorbells in accordance with disclosed embodiments. In accordance with embodiments where a requesting entity or platform deems the order of doorbell processing to not be critical, then Level 1 SQ structure can be configured into a bypass mode and Level 1 arbitration can be disabled completely 566, such that the Level 2 SQ and corresponding arbitration is the only arbitration which acts upon queued doorbells, as is depicted at FIG. 5C with reference to the SQ high space. The Level 1 SQ structure and arbitration can be individually disabled for each priority Q structure, depending on the software behavior and desired queue processing and arbitration behavior. Notably, each of the Level 1 SQ_x Queue spaces are missing, including Level 1 High 550, Level 1 medium 555, and Level 1 low 560 as depicted at, for example, FIG. 5A.

The size of the Level 2 SQ_x should preferably be set equal to the number of SQ in the host 119. Where the size of the Level 2 SQ_x is less than the number of SQs in the host 119, then implementing software needs to institute a guarantee that the number of SQs assigned to a specified prioritized Q cannot be more than the entry size of the Level 2 SQ_x, so as to avoid queue structure overflows.

Additionally, the size of the Level 1 SQ_x needs to be sufficiently large such that Level 2 SQ_x arbitration specifically and other active arbitration schemes need not be triggered as often. Otherwise, Level 1 SQ arbitration will provide a lesser benefit, and may be a candidate for complete disablement. Thus, tuning considerations warrant careful attention to the size of the Level 1 SQ_x structure or space.

Because a controller 105 allows a doorbell to be sent directly to I/O devices by applications, the host 119 may not have visibility to, or may simply be removed from the path or responsibility to manage submitted doorbell requests, and thus, appropriate arbitration and queuing schemes are advantageous because not only is the responsibility off-loaded from a host 119, but appropriate doorbell queue and processing priority management can nevertheless be attained. Relevant architectures include those which bypass the host OS's 120 file system and storage stack, such as with a controller 105 enabled to write directly to direct accessed storage 117 without management from the host 119 or even any involvement from the host 119 or the host OS 120, the host's 119 file system, etc.

In accordance with disclosed embodiments, implementing hardware (such as that within a controller 105) arbitrates and pulls/receives the jobs from the host 119 and post them into the local implementing firmware. Any misbehavior of the software on the host 119 side, such as malicious software is prevented, apart from the guaranteed fairness that all doorbell requests will be arbitrated so as to deliver a minimal level of servicing, but in such a way that an abusive application cannot overwhelm the Q structures or the arbitration mechanisms to gain an unfair servicing advantage over other more well behaved applications. For example, abusive applications will have unnecessarily repeated doorbells dropped completely and will have disproportionately voluminous doorbell requests de-prioritized to the lower Q structures until other arriving doorbells have sufficient access to fair doorbell processing.

In accordance with practice of the disclosed embodiments, the above described Level 1 SQ_x structure and the Level 2 SQ_x structures are new to the arts, especially in conjunction with a host bypassing methodology in which applications are enabled to directly submit doorbells. The combination of both Level 1 and Level 2 arbitration and switching back and forth between level 1 and 2 arbitration is also now to the arts, again, especially where in combination with such host bypassing scenarios. Setting a certain SQ (like SQ high) into level 1 and level 2 arbitration depending on software requirements and behavior, while disabling level 1 arbitration for other priority SQs additionally a new capability for the arts as is the ability for the Level 2 re-queue of a doorbell (after maximum number of SQE (jobs) has been processed).

Figure 5D:
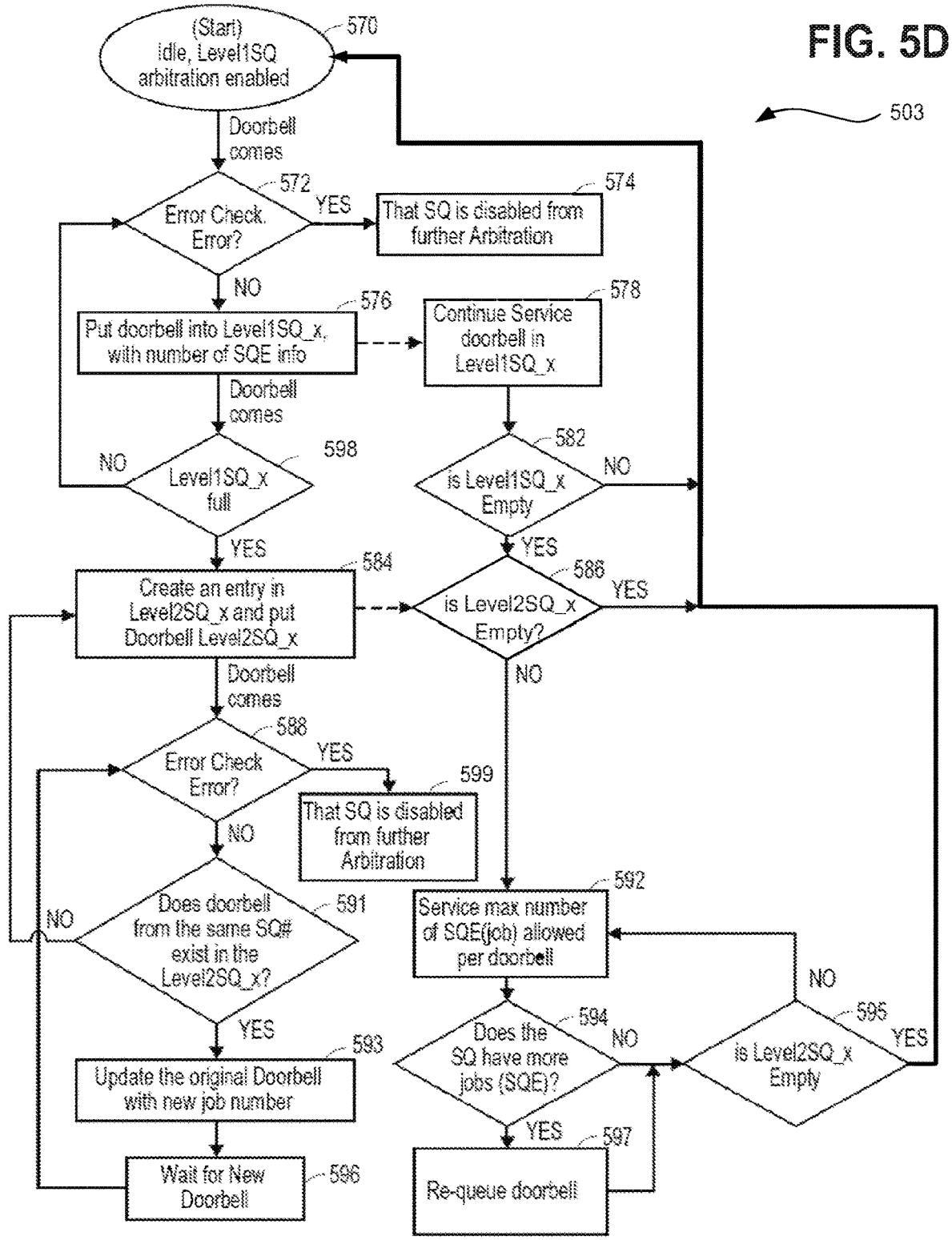
FIG. 5D depicts a high-level process flow 503 of the doorbell submission, queuing, and arbitration mechanisms in accordance with disclosed embodiments.

FIG. 5D depicts a high-level process flow 503 of the doorbell submission, queuing, and arbitration mechanisms in accordance with disclosed embodiments. For instance, block 570 depicts an idle, level 1 SQ arbitration mechanism enabled leading to block 572 for an arriving doorbell at which point the doorbell is error checked for erroneous, malicious, or attack based errors. If yes, an error exists, flow proceeds to block 574 for which the SQ is to disable the doorbell having the error from further arbitration. Conversely, if no error exists at 572, flow proceeds to block 576 where the doorbell is placed into a Level 1 SQ_x with information on the number of SQEs pending or present. For arriving doorbells flow proceeds to block 598 and if the Level 1 SQ_x is full, then flow proceeds to block 584 where an entry is created in Level 2 SQ_x space. Conversely, at block 598, if the Level 1 SQ_x is not full, flow returns to error check block 572. From block 584, flow may proceed to block 588 for arriving doorbells to perform an error check operation. If yes, an error exists, flow proceeds to block 599 and that SQ is disabled from further arbitration. Conversely, if no error flow moves from 588 error check block to 591 bock where it is determined if the doorbell from the same SQ exists in the Level 2 SQ_x already (e.g., via CAM matching against a SQid for the doorbell). If no, flow proceeds from 591 back up to block 584. If yes, the same SQ exists in the Level 2 SQ_x already, then flow proceeds to block 593 which updates the original doorbell with a new job number, from there, proceeding to block 596 to wait for a new doorbell, and when the new doorbell arrives, flow returns to block 588 for error check.

With reference now back to block 576, an alternative branch leads to block 578 which continues servicing doorbells in the Level 1 SQ_x space, then proceeding to 582 where the Level 1 SQ_x space is checked to see if it is empty. If no, not empty, then flow proceeds back to the start at block 570. If yes, empty, then flow proceeds then flow proceeds to block 586, and a check is made to determine if the Level 2 SQ_x is empty. Flow may also arrive to block 586 where the check is made to determine if the Level 2 SQ_x is empty advanced from the alternative branch of block 584 not addressed above. From block 586, if yes, Level 2 SQ_x is empty when checked, then flow returns back to the start at block 570. Alternatively, from block 586, if no, Level 2 SQ_x is not empty, then flow advances to block 592 where servicing upon a maximum number of SQE (Job) allowed per doorbell is checked via an appropriately configured threshold. Advancing to block 594, if the SQ has more jobs than the allowed SQE maximum then advancing to block 597 when yes, the doorbell is re-queued, which then advances the flow to block 595. Alternatively, if the SQ does not have more jobs than the allowed SQE maximum, then flow advances directly to block 595 without having to re-queue the doorbell. At block 595, a check is made to determine if the Level 2 SQ_x is empty. If no, the Level 2 SQ_x is not empty, then flow returns to block 592 where servicing upon a maximum number of SQE (Job) allowed per doorbell is checked once again. Alternatively, if yes, the Level 2 SQ_x is empty, then flow proceeds back to the start at block 570.

FIG. 6A depicts an exemplary architectural overview 600 to implement an interrupt coalescing scheme to reduce Interrupt Service Routine (ISR) overhead and also improve RAS by notifying on error conditions in accordance with disclosed embodiments.

In accordance with disclosed embodiments, solutions and methods for multiple interrupt generation using a messaging unit and a NTB in a controller 105 or other controller 480 provides a mechanism to implement an interrupt coalescing scheme to reduce ISR overhead and also improve RAS by notifying on error conditions. The disclosed embodiments address the problem of how to efficiently present interrupts to the host 119 and the host's local CPU from the controller's 105 Messaging Unit, such that it can deal with normal completions and errors. In accordance with the disclosed embodiments, an interrupt coalescing scheme is implemented to reduce ISR overhead and also to improve RAS by notifying on error conditions.

Furthermore, the interrupt coalescing scheme to the host 119 uses the NTB (Non-Transparent Bridging) pores capabilities. Using a number of MSI-X (Message Signaled Interrupts and Message Signaled Interrupt eXtension) vectors and the NTB ports doorbell mechanism, the messaging unit completion processing can be communicated to the host and the local host 119 system for processing of work queues 624 (e.g., via the API work queue engine 617) leading to higher system performance of a hosted application using the RAID stack and also for better handling of error conditions.

An exemplary storage controller 480 (e.g., a controller implementation 105) as depicted by FIG. 6A consists of an IOP (Integrated I/O Processor) that can instantiate an ANC (e.g., an ANC based FLASH memory device and Controller, such as those for NAND memory arrays) along with the messaging unit for controller 105. In such an embodiment, the IOP controller or other capable implementing controller 480 includes a number of components including L2 cache 455 (e.g., 128K to 1M is depicted), F/W for I/O processing RAID stack and management 606, an H-unit 460, a B-unit interface 415, DDR3 Memory with ECC 425, a D-Unit 607 (e.g., DRAM for write back cache; RAID buffering and F/W tables with Power fail detect and supported copy to flash mode), a DMA 603 engine or a CBDMA engine (e.g., to implement RAID calculation with DIF), a messaging unit 617 (e.g., a Messaging unit to implement the API work queue engine), an A-Unit/IOSF fabric 429 (On-chip Scalable System Fabric) and IOSF 430, PCIe ports 666 (e.g., implementing Host interface PCIe End Point up-link) to a host 119 or host machine 700 (FIG. 7) and for interconnecting such a host 119), SPI 435, UART 470, Legacy Blocks 475 (e.g., Timer, APIC, RTC), 3 PCIe Gen2 x8 Root 604 (e.g., links with native PCIe mode in chipset integrator), and a CPU, such as, for example, a dual core 1.6 GHz atom core with 8 GB of DDR3 memory. An NTB port for connection to the host 119 and 3×8 root ports which can be used communicate to the ANC or an SCU controller and a messaging unit that interacts with the driver to process submission queues and post completions is provided. The IOP or other implementing controller 480 connects to the host 119 through the NTB via an NTB-Root port configuration.

Figure 6B:
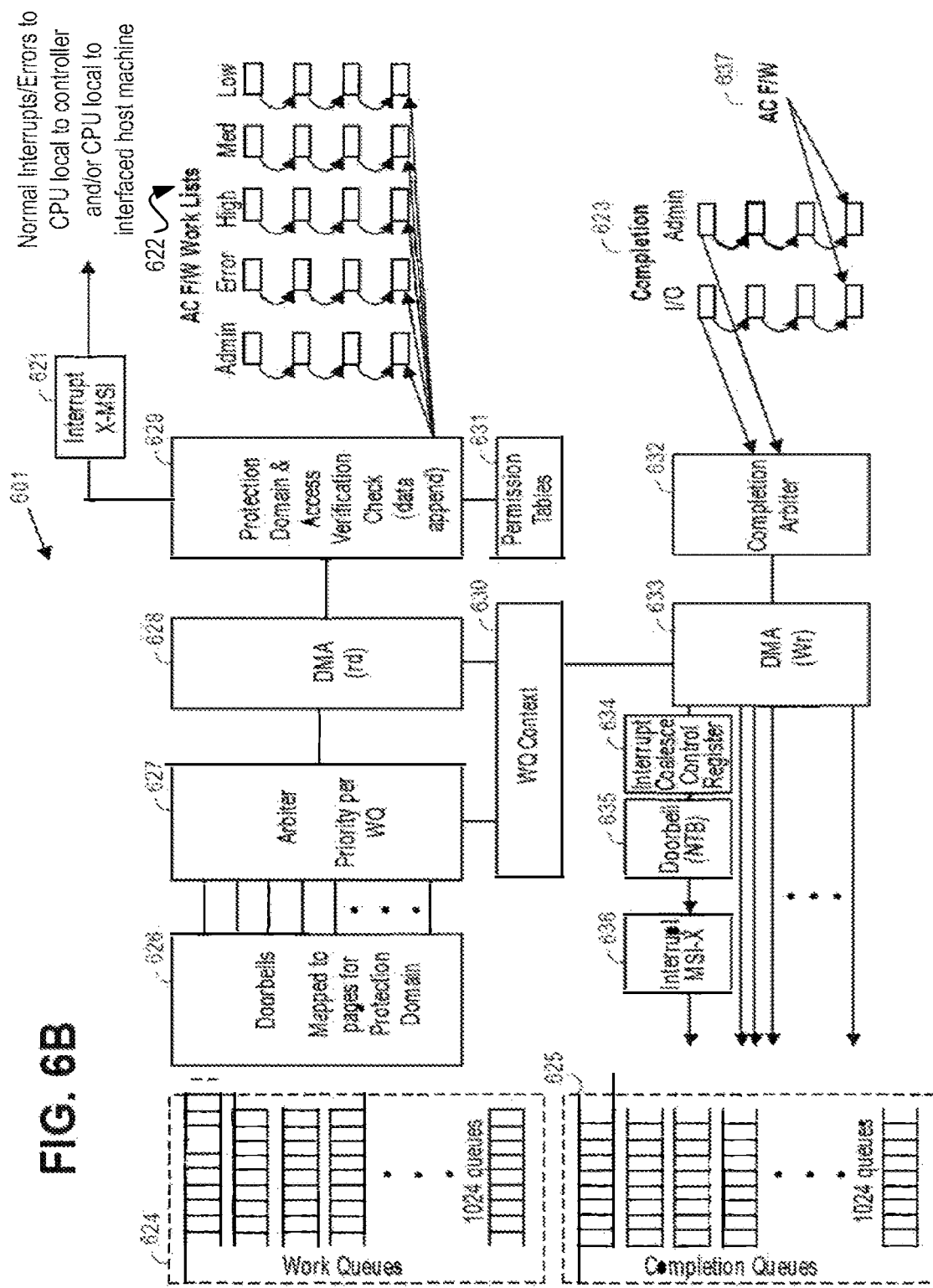
FIG. 6B depicts an alternative exemplary architectural overview 601 to implement an interrupt coalescing scheme in accordance with disclosed embodiments.

FIG. 6B depicts an alternative exemplary architectural overview 601 to implement an interrupt coalescing scheme in accordance with disclosed embodiments. As depicted, the Messaging Units (MUs 628 and 633 shown, in which MU 628 is a messaging unit DMA for reads and in which MU 633 is a messaging unit DMA for writes) are responsible for moving Submission Queue (SQ) entries such as those in Work Queue structure 624 posted in a host's 119 memory to the controller's 105 memory or to another implementing controller's memory (such as controller 480, etc.), and responsible for forwarding completion status to Completion Queues (CQs) 625 located in the host's 119 memory. In one embodiment, the messaging unit supports multiple SQs and CQs, by way of example, 1024 each×1024 entries. An arbitration scheme (e.g., as implemented by a messaging unit arbiter 627 with Priority per WQ) is employed within the messaging units 628, 633, to select one of the different queues for processing by the IOP's CPU via the controller firmware 637. These queues are classified into different types such as Admin, high, medium and low priority work queues by the driver for disposition, e.g., via the AC's F/W work lists 622 or such work lists for another capable implementing controller.

Host 119 initiates an operation by posting an SQ entry, and writing the Tail pointer to an SQ Doorbell register 626 in which messaging unit doorbells are mapped to pages for protection domain. The messaging unit checks the Protection Domain Identifiers 629 (e.g., messaging unit protection Domain and access verification check with data append) along with SQ Context lookup (e.g., via WQ context 630 and/or permission tables 631), and if the check fails, a bad (e.g., errored) doorbell value is logged and the doorbell 635 (e.g., via NTB) is dropped. Alternatively, if the check passes, the messaging unit checks a corresponding Priority Work List 622 Head and Tail and fetches an SQ entry from host 119. The messaging unit performs necessary book-keeping (e.g., via Completion arbiter 632), updates on the SQ entry and posts the Work List entry to a Work list Address the controller's 105 memory.

The controller firmware processes the work list entry and posts the completion 623 (e.g., I/O or Admin type doorbells) and informs the messaging unit. The messaging unit processes the pending completion queue and posts the corresponding completion to the completion queue 625 in the host's 119 memory.

The messaging unit implements MSI-X interrupts 621 and 636 for both host 119 CPUs and local CPUs of the controller 105 or IOP controller or other implementing controller 480. Two sets of MSI-X data structures support host 119 CPUs and local CPUs. In particular, Host MSI-X Interrupts of two types: 1) Completion Queue interrupts (normal interrupts) via MSI-X interrupt mechanism 636 which can occur whenever the messaging unit posts a completion to a host's 119 completion queue. In accordance with the disclosed embodiments, these first type of "completion queue interrupts" are coalesced (e.g., via the interrupt coalesce control register 634) discussed in additional detail below. 2) The second type being an Error Interrupt via MSI-X interrupt mechanism 621 which indicates that an error condition has occurred which will impact the Driver and messaging unit's operation. The Error Interrupt type causes an immediate interrupt in accordance with disclosed embodiments.

In accordance with an alternative embodiment, an EXPROM may be disabled in host 119 via jumper settings of the host 119 motherboard or the host's 119 BIOS may be configured to not enable the EXPROM after it has loaded drivers.

In accordance with one embodiment, MSI-X capabilities enable the messaging unit to generate one error interrupt and 32 normal interrupts to the host's 119 CPU. In an exemplary embodiment, entries 0-31 of the MSI-X table are assigned to Normal interrupts and entry 32 is assigned to the Error Interrupt. In such an embodiment, the messaging unit has 1024 normal interrupt sources, but this quantity may obviously vary. These normal interrupt sources can be mapped in to any one of the 32 normal interrupts using dedicated mapping registers in the controller 105. Likewise, the messaging unit error sources can be mapped to an error interrupt using similar mapping registers.

Interrupt Coalescing capabilities implement a coalescing algorithm for use by the messaging unit such that an interrupt to the driver is only asserted if either the number of outstanding completions exceeds the Coalesce Number defined in the "Interrupt Coalescing Control Register" 634 or the coalesce timer expires through the use of 32 Interrupt Coalescing Control registers to control the "Coalesce Number" and "Coalesce Timer" for 32 MSI-X interrupt vectors assigned for completions.

The Coalesce Timer field specifies a minimum/maximum delay before an interrupt is issued. The time is based off a free running timer so the minimum range will be observed if the timer expired just after the completion entry was posted, and the maximum range will be observed if the timer expires just before the completion entry was posted.

Figure 6C:
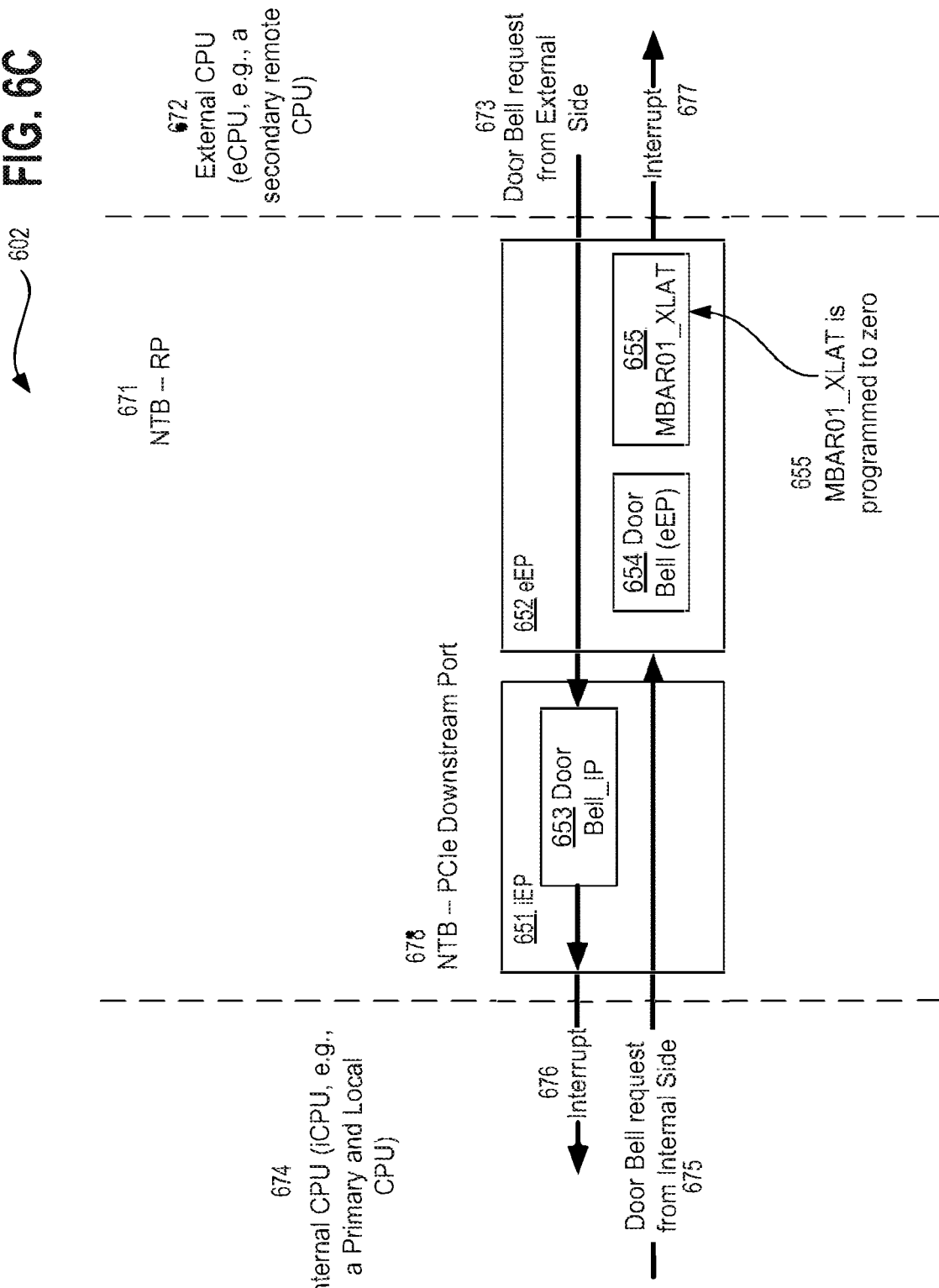
FIG. 6C depicts an alternative exemplary architectural overview to implement an interrupt coalescing scheme in accordance with disclosed embodiments.

FIG. 6C depicts an alternative exemplary architectural overview 602 to implement an interrupt coalescing scheme in accordance with disclosed embodiments.

Interrupt Generation via NTB/NTB-RP 671 capabilities operate cooperatively with the host's 119 processor 672 (e.g., External CPU/eCPU, such as a host or host's secondary remote CPU) when Message-Signaled Interrupts (MSI) or MSI-X (MSI eXtensions) are enabled. The messaging unit is responsible for performing a peer to peer write to the NTB (external to the messaging unit) to generate appropriate MSIs or MSI-Xs.

An NTB has a DOORBELL register defined for the external endpoint of the controller 105 as seen by the host 119 to implement door bell requests from the external side 673. The DOORBELL register contains 33 bits for mapping the messaging unit to the host's 119 completion queue and error interrupts. In addition, the DOORBELL register has a dedicated field for signaling to the host that the controller 105 (or other controller such as IOP controller or controller 480, etc.) is ready for operation after all initialization is completed.

During system initialization, the configuration software for an MSI-X compatible system will read the MSI-X table size in the "MSI-X Capability Register" of NTB to determine that 33 unique interrupt messages are supported, for example, via NTB to PCIe downstream port 678. The configuration software will also read the "MSI-X Table Offset Register" and "MSI-X Pending Bit Array Offset Register" of NTB PCIe configuration space to determine the locations of these structures.

The configuration software will initialize the MSI-X Table by writing the Message Address Registers (and the Message Upper Address Registers if Message Address is above the 4-Gigabyte addressable boundary), the Message Data Registers, and the Vector Control Registers in order to unmask a Table entry. Configuration of MSI-X completes by setting the MSI-X Enable in the "MSI-X Capability Register" of NTB.

Local MSI-X Generation from messaging unit supports two types of interrupts to local CPU of an implementing controller (such as an atom processor within, for example, a controller 105). 1) Normal Interrupts being the first type include the following: a) MSI-X on adding new Priority Work Entry to any Priority Work List; b) MSI-X on adding new Admin Work Entry to Admin Work List; c) MSI-X when Pending Completion Queue (PCQ) transitions from a full state to not full state; and d) MSI-X when Admin PCQ transitions from full state to not full state.

Error Interrupts being the second type indicates one or more error conditions have occurred which will impact the messaging unit's operation. Examples include incorrect read/write pointers, erroneous initialization errors, incorrect regions, etc.

Internal CPU 674 (e.g., iCPU such as a primary and local CPU for the implementing controller) is thus interruptible, for example, via interrupt 676 as shown, coming from iEP 651 in which a Door Bell_IP 653 is triggered. Door bell requests may also arrive from the internal side 675, such as from within the implementing controller. Doorbell (eEP) 654 at eEP 652 is shown as is MBAR01_XLAT 655, which is programmed to zero in accordance with disclosed embodiments, exiting the controller to the external side via, for example, interrupt 677.

In certain embodiments, an MSI-X address space is defined for improving system performance by assigning dedicated address and data vectors for each type of interrupt.

A messaging unit can typically generate 1000*s* of interrupts for each submission queue that it completes. Accordingly, the interrupt coalescing scheme as disclosed herein provides a remap mechanism to reduce these large submission queue completions through a smaller subset of MSI-X vectors that can be managed by Firmware in accordance with the disclosed embodiments. Furthermore, hardware utilized by the interrupt coalescing scheme provides facilities for interrupt coalescing to reduce the ISR invocation overhead and thus, removing computational stress from the CPUs involved, including the host's 119 CPU and also that of an implementing controller, such as a CPU within the controller 105. Further still, the NTB port in the controller 105 may be augmented with a compatible doorbell mechanism to map these vectors on a one to one basis for notification purposes.

Practice of the disclosed embodiments utilizing the interrupt coalescing scheme provides a solution to the shortcomings of the large MSI-X vector handling by the prior architectures (such as IA32) and is therefore more scalable. The interrupt coalescing scheme provides improved RAS by isolating errors and assigning unique interrupts. Through the remap facility described above, the large number of interrupts from the completion queues can be constrained to a smaller subset and sent through the NTB port via a doorbell mechanism. In addition, interrupt coalescing improves overall system performance due to the reduction in overhead associated with handling single or individual interrupts on a one by one basis when it is not necessary to do so, while at the same time, permitting immediate interrupt triggering on an error condition for which one by one notification schemes may be more appropriate.

Practice of the disclosed embodiments utilizing the interrupt coalescing scheme further improves use of RAID On Chip (ROC) as well as external storage platforms with a messaging unit that handles work queue submissions and needs notification to the CPUs. Storage may be of a direct accessed storage 117 type which operates outside of the management of the host 119 or may be of a type of storage which operates under the control of a host 119.

Figure 7:
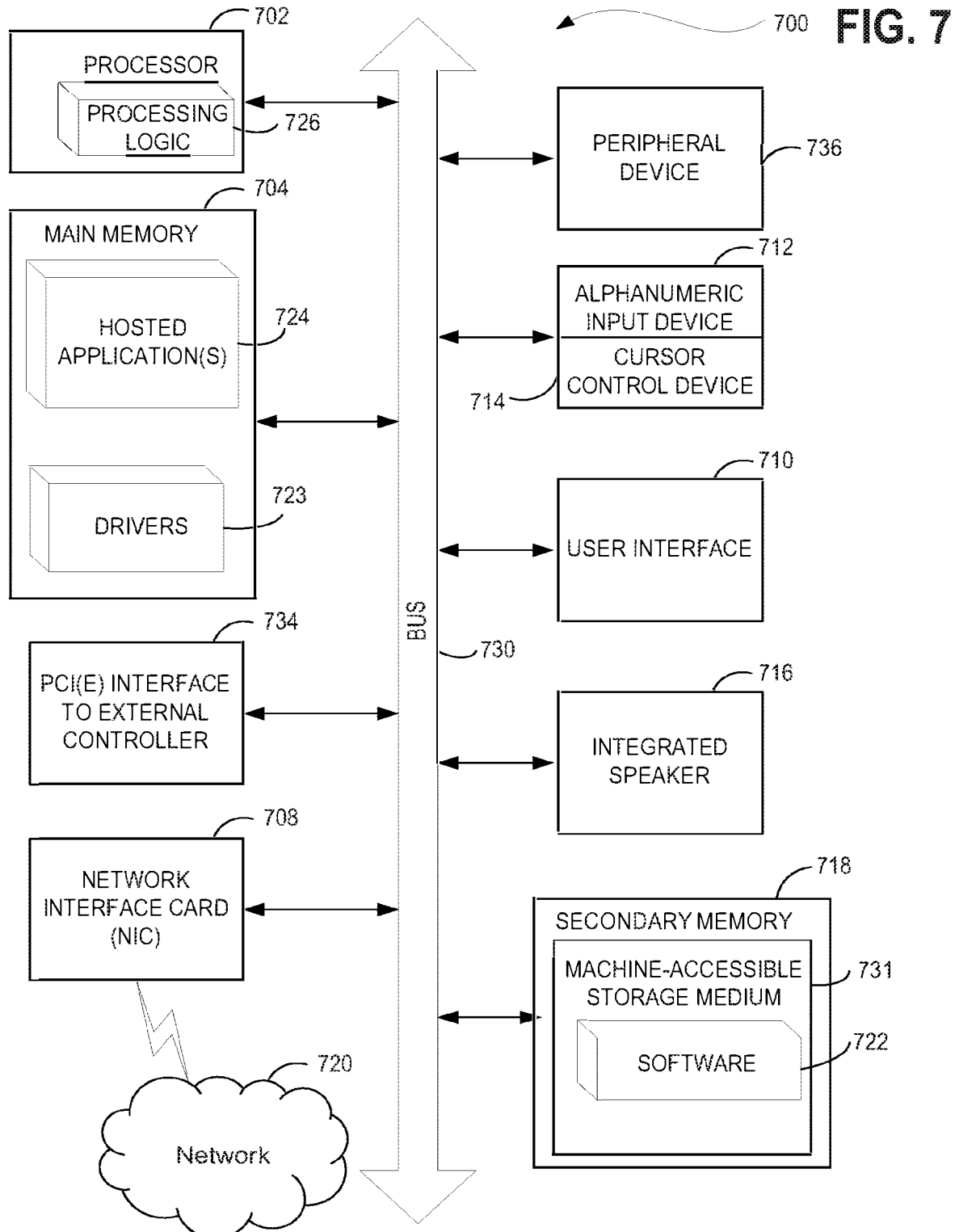
FIG. 7 illustrates a diagrammatic representation of a host machine in the exemplary form of a computer system, in accordance with disclosed embodiments.

FIG. 7 illustrates a diagrammatic representation of a host machine 700 in the exemplary form of a computer system, in accordance with one embodiment, within which a set of instructions, for causing the host machine/computer system 700 to perform in cooperation with any one or more of the methodologies discussed herein may execute. In alternative embodiments, the machine may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 718 (e.g., a non-transitory and non-volatile physical storage device including hard disk drives), which communicate with each other via a bus 730. Main memory 704 includes one or more hosted applications 724 to operate and execute upon the host machine 700. Main memory 704 further includes drivers 723 enabling the host to communicate with various peripheral unites, such as PCIe interface 734 communicatively interfaced with the host machine's 700 bus 730 and further communicatively with an external controller as depicted at FIG. 7 (e.g., such as a PCIe communication interface to a controller 105 or other controller 480, etc.). Main memory 704 and its sub-elements (e.g. 723 and 724) are operable in conjunction with processing logic 726 and processor 702 to perform the methodologies discussed herein and to operate cooperatively with the various methodologies described.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which is discussed herein.

The computer system 700 may further include a network interface card 708. The computer system 700 also may include a user interface 710 (such as a video display unit, a liquid crystal display (LCD), or a cathode ray tube (CRT)), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc.).

The secondary memory 718 may include a non-transitory machine-readable or computer readable storage medium 731 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface card 708.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. An apparatus comprising:
    an input/output interface (I/O interface) configured to couple with a direct accessed storage that includes one or more solid state drives; and
    a storage adapter configured to provide a partition table on behalf of the direct accessed storage and to synthesize the partition table as directed by a driver of the direct accessed storage, wherein the partition table is configured to enable logical block access to non-contiguous blocks of storage of the one or more solid state drives over the I/O interface.

2. The apparatus of claim 1, further comprising the direct accessed storage, wherein the direct accessed storage is configured to operate independently of a host, a host operating system, and/or a host managed file system, and wherein the direct accessed storage is not managed or controlled by the host, the host operating system, and/or the host managed file system.

3. The apparatus of claim 2, wherein the host, the host operating system, and/or the host managed file system includes the host and/or the host operating system, and wherein the direct accessed storage is directly accessible to at least one application hosted by the host or supported by the host operating system.

4. The apparatus of claim 1, wherein the one or more solid state drives include NAND flash memory.

5. The apparatus of claim 1, wherein the storage adapter is further configured to implement, maintain, and store the partition table.

6. The apparatus of claim 1, wherein the apparatus is implemented within a controller.

7. The apparatus of claim 6, wherein the controller comprises:
    a local controller Central Processor Unit (CPU);
    local controller memory;
    a PCIe (Peripheral Component Interconnect Express) interface configured to communicatively link the controller with a host; and
    a controller interface configured to communicate instructions with the host via the PCIe interface.

8. The apparatus of claim 7, wherein:
    the controller interface is further configured to receive a logical block access request from the host for data stored upon the direct accessed storage; and
    the controller is further configured to fulfill the logical block access request from the host via the storage adapter's implemented logical block access to the direct accessed storage over the I/O interface coupled with the direct accessed storage.

9. The apparatus of claim 1, wherein the partition table makes the direct accessed storage visible to a host operating system.

10. A system comprising:
    a direct accessed storage that includes one or more solid state drives; and
    a controller that includes:
        an input/output interface (I/O interface) configured to couple with the direct accessed storage; and
        a storage adapter configured to provide a partition table on behalf of the direct accessed storage and to synthesize the partition table as directed by a driver of the direct accessed storage, wherein the partition table is configured to enable logical block access to non-contiguous blocks of storage of the one or more solid state drives over the I/O interface.

11. The system of claim 10, wherein the direct accessed storage is configured to operate independently of a host, a host operating system, and/or a host managed file system, and wherein the direct accessed storage is not managed or controlled by the host, the host operating system, and/or the host managed file system.

12. The system of claim 11, wherein the host, the host operating system, and/or the host managed file system includes the host and/or the host operating system, and wherein the direct accessed storage is directly accessible to at least one application hosted by the host or supported by the host operating system.

13. The system of claim 10, wherein the one or more solid state drives include NAND flash memory.

14. The system of claim 10, wherein the storage adapter is further configured to implement, maintain, and store the partition table.

15. The system of claim 10, wherein the controller further comprises:

a local controller Central Processor Unit (CPU);
local controller memory;
a PCIe (Peripheral Component Interconnect Express) interface configured to communicatively link the controller with a host; and
a controller interface configured to communicate instructions with the host via the PCIe interface.

16. The system of claim 15, wherein:
the controller interface is further configured to receive a logical block access request from the host for data stored upon the direct accessed storage; and
the controller is further configured to fulfill the logical block access request from the host via the storage adapter's implemented logical block access to the direct accessed storage over the I/O interface coupled with the direct accessed storage.

17. The system of claim 10, wherein the partition table makes the direct accessed storage visible to a host operating system.

* * * * *